US012686197B2

(12) United States Patent
Jamart et al.

(10) Patent No.: US 12,686,197 B2
(45) Date of Patent: Jul. 21, 2026

(54) LAMINATED VEHICLE GLAZING AND DEVICE COMPRISING AN ASSOCIATED NEAR-INFRARED DETECTION SYSTEM

(71) Applicant: SAINT-GOBAIN GLASS FRANCE, Courbevoie (FR)

(72) Inventors: Juliette Jamart, Compiegne (FR); Keihann Yavari, Margny-les-Compiegne (FR)

(73) Assignee: SAINT-GOBAIN SEKURIT FRANCE, Courbevoie (FR)

( * ) Notice: Subject to any disclaimer, the term of this patent is extended or adjusted under 35 U.S.C. 154(b) by 299 days.

(21) Appl. No.: 18/554,546

(22) PCT Filed: Apr. 8, 2022

(86) PCT No.: PCT/FR2022/050666
§ 371 (c)(1),
(2) Date: Oct. 9, 2023

(87) PCT Pub. No.: WO2022/219273
PCT Pub. Date: Oct. 20, 2022

(65) Prior Publication Data
US 2024/0198637 A1     Jun. 20, 2024

(30) Foreign Application Priority Data

Apr. 14, 2021     (FR) ..................................... 2103845

(51) Int. Cl.
*B32B 17/10*          (2006.01)
*B32B 3/26*           (2006.01)
*G01S 7/481*          (2006.01)

(52) U.S. Cl.
CPC ........ *B32B 17/10449* (2013.01); *B32B 3/266* (2013.01); *B32B 17/10036* (2013.01);
(Continued)

(58) Field of Classification Search
CPC ........ B32B 17/10036; B32B 17/10449; B32B 3/266; B32B 17/10293; B32B 17/10348;
(Continued)

(56) References Cited

U.S. PATENT DOCUMENTS 6,132,882 A     10/2000  Landin et al.
2004/0080275 A1   4/2004  Schmitt et al.
(Continued)

FOREIGN PATENT DOCUMENTS

CN          104296074 A       1/2015
CN          111409314 A       7/2020
(Continued)

OTHER PUBLICATIONS

GR First Office Action and Search Report as issued in Chinese Patent Application No. 202280003177.X, dated Dec. 20, 2023.
(Continued)

*Primary Examiner* — Joanna Pleszczynska
(74) *Attorney, Agent, or Firm* — CUSHMAN PARTNERS, LLC

(57)          ABSTRACT

A vehicle laminated glazing includes a first extra clear glass sheet forming an exterior glazing, a lamination interlayer and a second glass sheet forming an interior glazing with a through-hole in this second sheet including a piece with a camouflaging coating.

20 Claims, 9 Drawing Sheets

(52) U.S. Cl.
CPC .. *B32B 17/10119* (2013.01); *B32B 17/10293* (2013.01); *B32B 17/10348* (2013.01); *B32B 17/10385* (2013.01); *B32B 17/10761* (2013.01); *G01S 7/4811* (2013.01); *B32B 2255/26* (2013.01); *B32B 2307/41* (2013.01); *B32B 2307/42* (2013.01); *B32B 2605/08* (2013.01); *B32B 2605/10* (2013.01)

(58) Field of Classification Search
CPC ............ B32B 2307/41; B32B 2605/08; B32B 2605/10
See application file for complete search history.

(56) References Cited

U.S. PATENT DOCUMENTS

| | | | |
|---|---|---|---|
| 2004/0258929 A1 | 12/2004 | Glaubitt et al. | |
| 2007/0216768 A1* | 9/2007 | Smith .................... | B60R 11/04 348/118 |
| 2020/0377692 A1 | 12/2020 | Grosser et al. | |
| 2021/0059022 A1 | 2/2021 | Sadakane et al. | |

FOREIGN PATENT DOCUMENTS

| | | | |
|---|---|---|---|
| DE | 10 2008 014089 A1 | 9/2009 | |
| DE | 10 2010 004443 A1 | 7/2011 | |
| EP | 1 329 433 A1 | 7/2003 | |
| EP | 3 450 231 A1 | 3/2019 | |
| FR | 3 086 589 A1 | 4/2020 | |
| GB | 2 271 139 A | 4/1994 | |
| NL | 1 043 222 B1 | 10/2020 | |
| WO | WO 2004/025334 A2 | 3/2004 | |
| WO | WO 2005/049757 A1 | 6/2005 | |
| WO | WO 2008/059170 A1 | 5/2008 | |
| WO | WO 2014/128016 A1 | 8/2014 | |
| WO | WO 2018/015312 A1 | 1/2018 | |
| WO | WO 2018/178278 A1 | 10/2018 | |
| WO | WO 2018/178286 A1 | 10/2018 | |
| WO | WO 2021/053138 A1 | 3/2021 | |
| WO | WO 2021/136907 A1 | 7/2021 | |
| WO | WO 2021/136908 A1 | 7/2021 | |

OTHER PUBLICATIONS

International Search Report as issued in International Patent Application No. PCT/FR2022/050666, dated Jul. 14, 2022.

* cited by examiner

LAMINATED VEHICLE GLAZING AND DEVICE COMPRISING AN ASSOCIATED NEAR-INFRARED DETECTION SYSTEM

CROSS-REFERENCE TO RELATED APPLICATIONS

This application is the U.S. National Stage of PCT/FR2022/050666, filed Apr. 8, 2022, which in turn claims priority to French patent application number 2103845 filed Apr. 14, 2021. The content of these applications are incorporated herein by reference in their entireties.

The invention relates to a laminated glazing, in particular a windscreen, in a vehicle particularly a road vehicle or train, associated with a near infrared detection system. The invention also describes a device combining said glazing and the near infrared detection system.

Autonomous vehicle glazings and the associated technology are constantly evolving, particularly for improving safety.

Laser remote sensing or LIDAR (an acronym for "light detection and ranging" or "laser detection and ranging") can be used in the headlights of autonomous vehicles.

More recently, patent application WO20180153012 suggests placing a LIDAR operating in the near infrared between 750 nm and 1050 nm behind the laminated windscreen comprising two sheets of extra clear glass and an infrared filter.

The performance of this vision device (glazing associated with the LIDAR) can be improved.

To this end, the present invention relates to a laminated glazing of a vehicle, particularly of a road vehicle (car, truck, public transport: bus, coach, etc.) or railway vehicle (particularly with a maximum speed of at most 90 km/h or at most 70 km/h, in particular subway trains, trams), particularly curved, in particular a windscreen, or a rear window, indeed even a side glazing, of a given thickness E1, for example sub-centimetric, particularly of at most 9 mm or 7 mm or 5 mm for a road vehicle windscreen, the glazing comprising:

a first glass sheet, particularly curved, intended to be the exterior glazing, with a first main external face F1 and a second main internal face F2 oriented toward the passenger compartment, if a motor vehicle with a thickness preferably of at most 4 mm, and even of at most 3 mm or 2.5 mm—particularly 2.1 mm, 1.9 mm, 1.8 mm, 1.6 mm and 1.4 mm—and preferably of at least 0.7 mm or 1 mm a lamination interlayer (single or multi-laminations), optionally neutral, clear, extra clear or tinted particularly gray or green, made of polymer material preferably thermoplastic and better still polyvinyl butyral (PVB preferably with plasticizers), preferably if a road vehicle with a thickness of at most 1.8 mm, better still of at most 1.2 mm and even of at most 0.9 mm (and preferably of at least 0.3 mm and even of at least 0.6 mm), the lamination interlayer being optionally acoustic and/or optionally having a cross section decreasing in the shape of a wedge from top to bottom of the laminated glazing (in particular a windscreen) for a head-up display (HUD), the lamination interlayer having a main face Fa oriented toward F2 and a main face Fb opposite Fa a second glass sheet intended to be the interior glazing, preferably curved and in particular tinted, with a third main face F3 on the side of F2 and a fourth main internal face F4 oriented toward the passenger compartment, if a road vehicle with a thickness preferably less than that of the first glazing, even of at most 3 mm or 2 mm—particularly 1.9 mm, 1.8 mm, 1.6 mm and 1.4 mm—or even of at most 1.3 mm, and preferably of at least 0.7 mm, the thickness of the first and second glass sheets being preferably strictly less than 5 or 4 mm, even than 3.7 mm.

The second glass sheet, particularly silica-based, soda lime-based, preferably soda-lime-silica-based, even aluminosilicate-based, or borosilicate-based, has a total iron oxide content by weight (expressed in the form $Fe_2O_3$) of at least 0.4% and preferably of at most 1.5%.

The first glass sheet, particularly silica-based, soda-lime-based, soda-lime-silica-based, or aluminosilicate-based, or borosilicate-based, has a total iron oxide content by weight (expressed in the form $Fe_2O_3$) of at most 0.05% (500 ppm), preferably of at most 0.03% (300 ppm) and of at most 0.015% (150 ppm) and particularly greater than or equal to 0.005%. The redox of the first glass sheet is preferably greater than or equal to 0.15. The first glass sheet and the piece is preferably an extra clear glass.

The glazing according to the invention further comprises:

a through-hole in the thickness of the second glass sheet, the through-hole being centimetric (in size) (along the surface of the second glass sheet), hole delimited by a wall, closed-off hole or opening hole (notch) (particularly on a longitudinal edge), in the through-hole and optionally under the through-hole (flush under face F3) and/or flush with or flush over face F4, a piece (particularly mineral, for example glass, in particular extra clear or else polymer) which is transparent at least at a "working" wavelength in the infrared in a range extending from 800 nm to 1800 nm, in particular from 850 nm to 1600 nm, particularly 905±30 nm and/or 1550±30 nm (for a LIDAR), which piece particularly has a thickness of at least 0.3 mm, piece preferably with an edge face in contact with or spaced apart from the wall (of the through-hole) by a distance of at most 5 mm The piece according to the invention has:

a main "connecting" surface, oriented toward face F2, in particular a main connecting surface which is naked or coated with a functional layer, which connecting surface is connected to face F2 (naked or coated), connecting surface for example adhesively bonded by an adhesive (particularly thermosetting) or a thermoplastic connecting film (sheet) which is optionally different from the lamination interlayer (lamination interlayer with optional interlayer through-hole or partial hole)—particularly an adhesive or connecting film of a different thickness to the lamination interlayer and/or made of a different material to the lamination interlayer (preferably thermoplastic)—or else connecting surface connected to the main face Fb (lamination interlayer with optional partial interlayer hole on the Fb side) and face Fa is connected to face F2 and a main "interior surface" surface, opposite the connecting surface.

The piece comprises, preferably on the connecting surface (rather than the interior surface), a camouflaging coating forming a selective filter which absorbs in the visible range and is transparent at the working wavelength.

The laminated glazing then has, in the zone of the through-hole with the camouflaging coating, a total transmission preferably of at most 10.0%, 5.0% or 1.0% or 0.5% in the visible range, particularly at least at a reference value in a range from 400 nm to 700 nm, or even in the whole range extending from 500 to 600 nm) particularly measured at the angle of incidence 0° (normal relative to the local plane of the piece) or even preferably also at 60° or even up to the angle of incidence 60°, better still a total transmission of at most 0.3% and even of at most 0.1% between 400 and 600 nm or even in the whole range extending from 500 to 600 nm.

Thus, according to the invention, the following is selected for the laminated glazing in order to reach a high level of transmission:

1) an exterior glass that is extra clear in the targeted near infrared,
  2) an interior glass that may be more absorbent in the targeted near infrared than the exterior glass and necessarily hollowed out.

This solution is more efficient than the one that is based on two solid extra clear glass sheets.

Additionally, by avoiding the use of a second extra clear glass sheet, it improves the comfort (heat inside the vehicle), aesthetics and is less expensive.

Iron oxide, present as an impurity in most of the natural raw materials used in glassmaking (sand, feldspar, limestone, dolomite, etc.), absorbs both in the visible and near-ultraviolet region (absorption due to the ferric ion $Fe^{3+}$) and especially in the visible and near-infrared region (absorption due to the ferrous ion $Fe^{2-}$). This is why the iron oxide is reduced in the first glass sheet.

In the second glass sheet, the choice can be made to have a higher level of iron oxide.

Moreover, to improve safety, this piece according to the invention is added in the through-hole which, in order not to adversely affect the efficiency of the detection system (LIDAR, near infrared camera, etc.), is made of material which is transparent at the working wavelength. The camouflaging coating serves to conceal this infrared transmission zone—or even the infrared detection system at said working wavelength (LIDAR etc.)—from the outside of the vehicle, without adversely affecting the excellent transmission at the working wavelength.

The camouflaging coating preferably occupies (substantially) at least 90% or 95% or 100% of the interior surface or preferably of the connecting surface.

The camouflaging coating (preferably deposited by the liquid route) may be directly on the surface of the piece (preferably connecting surface) or on a functional layer such as a heating layer.

The invention is particularly suitable for glazings (windscreen, window, etc.) for autonomous or semi-autonomous vehicles: levels L2+, L3, L4 and L5 ("fully" autonomous) as well as vehicles such as Robot Taxis and shuttles, etc.

The angle of the glazing, particularly a windscreen of a road vehicle, can typically be between 21° and 36° with respect to the ground and on average 30°.

The invention is well suited for camouflaging the zone of the through-hole which is a near infrared transmission zone for a LIDAR or a near infrared camera (SWIR, shortwave infrared).

Preferably, in the zone of said through-hole with the camouflaging coating (infrared transmission zone), the laminated glazing (comprising the first glass sheet, the (thermosetting) adhesive or thermoplastic connecting film and/or the lamination interlayer, the piece with camouflaging coating) has a total transmission of at least 80%, 85%, 90.0%, (or of at least 91.0% if it is with the anti-reflective element) at the working wavelength, particularly 905±30 nm and/or 1550±30 nm, particularly measured at the angle of incidence 0° (normal relative to the local plane of the piece) or even preferably also at 60° or even up to the angle of incidence of 60° and preferably a total transmission of at most 1.0% or 0.5% or 0.1% in the visible range, particularly at least at a reference value in a range from 400 nm to 700 nm or even in the whole range extending from 500 to 600 nm.

The total infrared transmission is measured for example with a spectrophotometer such as the lambda 900 from Perkin Elmer.

Preferably (before assembly in the glazing), the piece with said camouflaging coating has:
  a total transmission of at most 20%, 15%, 10.0%, 5.0% or 1.0% or 0.5% in the visible range, particularly at least at a reference value in a range from 400 nm to 700 nm, or even in the whole range extending from 500 to 600 nm) particularly measured at the angle of incidence 0° or even preferably also at 60° or even up to the angle of incidence 60°, better still a total transmission of at most 0.3% and even of at most 0.1% between 400 and 600 nm or even in the whole range extending from 500 to 600 nm,
  a total transmission of at least 85%, 90.0%, 91.0%, or even at least 92.0% (or even 93% or 94% if it is with the anti-reflective element) at the working wavelength, particularly 905±30 nm and/or 1550±30 nm, particularly measured at the angle of incidence 0° or even preferably also at 60° or even up to the angle of incidence of 60°.

The piece with the camouflaging coating (particularly organic) can be laminated. In particular, it withstands the temperature and pressure conditions during lamination.

When the coating is organic, it is preferred for the piece to be optionally bent at high temperature (for example made of glass) before the camouflaging coating is deposited.

In order to quantify the transmission of the glass in the visible range, a light transmission factor, referred to as light transmission, is often defined, often abbreviated to "TL", calculated between 380 and 780 nm and applied to a glass thickness of 3.2 mm or 4 mm, according to standard ISO 9050:2003, thus taking into account the illuminant D65 as defined by standard ISO/CIE 10526 and the C.I.E 1931 standard colorimetric observer as defined by standard ISO/CIE 10527.

Naturally, the light transmission TL of the laminated glazing in a zone without a hole (central zone of the windscreen) is preferably of at least 70% or 75%, 80% or 85%, 88%.

The camouflaging coating according to the invention is for example a solid layer or even one with discontinuities. This camouflaging coating may be of any nature: organic or mineral, ink, varnish (particularly a coloring layer, detailed below), it is located on the piece and another camouflaging coating may supplement and/or perfect the camouflaging (for aesthetic reasons, etc.) for example to conceal all or part of the detection system (LIDAR, SWIR, etc.) or the attachment of the detection system or else one or more (nearby) sensors, as detailed below.

In a preferred embodiment, the camouflaging coating comprises an organic matrix, particularly polymeric, and a coloring agent, particularly dispersed in said matrix, in particular organic pigment (i.e. particle) or molecular dye, particularly black. Thus, said coloring agent absorbs (substantially all of) the light located in said visible range and is (substantially) transparent at said working wavelength.

The camouflaging coating may be of submillimetric thickness and even of at most 30 or 20 μm and for example of at least 2 μm or 5 μm.

The coloring agent, particularly organic pigment or molecular dye, preferably represents between 0.1% and 10% by weight of the camouflaging coating, preferably between 0.2 and 3% by weight of the camouflaging coating.

It is possible to adjust the thickness of the camouflaging coating or the percentage by weight of coloring agent.

The transmission at the working wavelength is increased if, all else being equal, the thickness is reduced.

The organic matrix can be selected from monomers, oligomers, or polymers comprising at least one methacrylate function, epoxides, varnishes consisting of dispersed PVB particles, latex, polyurethane or acrylate.

The organic matrix may be a resin cured by a drying heat treatment particularly of at most 150° C. and for example for at most 10 min to eliminate organic solvent. The drying can alternatively be carried out in the air.

The camouflaging coating can contain any coloring agent (pigment, particularly organic, or molecular dye) having a higher transmittance in the infrared than its transmittance in the visible range, such as a black ink which substantially absorbs visible wavelengths and transmits those in the near infrared. For example, the camouflaging coating may contain (consist of) dyes or inks such as Spectre™ inks, for example Spectre™ 100, 110, 120, 130, 140, 150, or 160 (Epolin, Newark, NJ); Mimaki inks, for example Mimaki ES3, SS21, BS3, SS2, or HS (Mimaki Global, Tomi-city, Nagano, Japan); or Seiko inks, for example Seiko 1000, 1300, SG700, SG740, or VIC (Seiko Advance Ltd., Japan) or else IR9508 black ink from MingBo anti Forgery Technology Co ltd The camouflaging coating may contain one or more black, cyan, magenta or yellow dyes, particularly molecular dye, organic or inorganic pigment.

In the camouflaging coating, the coloring agent may be selected in particular from Sudan Black B® or Nigrosine Solvent black 5 or else the coloring agent N7527B from Epolin, which is a black molecular dye.

The camouflaging coating may include chemical (molecular) dyes or (organic and/or mineral) dyes, or both.

The camouflaging coating may be a screen-printed layer. It is possible to adjust the thickness by selecting the size of printing screen and/or by diluting the ink used.

The glazing may comprise a masking layer which is opaque in the visible range and at the working wavelength, particularly an enamel (black etc.) or an organic layer (black etc.) which is a coating on face F2 and/or on face Fa or Fb (in particular on Fa or Fb, an ink, particularly black, etc.), at the edge of the through-hole, in particular in the peripheral zone and even central and preferably along the (upper) longitudinal edge of the glazing. The opaque masking layer is for example on face F2.

The masking layer can then have a gap (closed or opening on the edge face of the glazing) in line with said through-hole (at least in the central zone) and preferably which protrudes by at most 50 mm, 30 mm or 20 mm or 10 mm, 7 mm or 5 mm under said through-hole.

This opaque masking layer masks the infrared detection system and/or for example its casing from the outside. The opaque masking layer can be a PVB-based layer printed on the lamination interlayer, for example on the PVB. The opaque masking layer is preferably a continuous layer (flattened with a solid edge or alternatively a gradient edge (set of patterns). The masking layer can be at 2 mm or 3 mm (less than 5 mm) from the edge face of the glazing (closest). The opaque masking layer may be a strip surrounding the glazing (windscreen etc.), particularly made of black enamel with a widened zone, particularly in the central position of the upper longitudinal edge. This therefore creates a gap in this masking layer, for example in this widened zone.

Another opaque masking layer (particularly black enamel, or ink, etc.) can be on face F3 or F4 particularly facing toward the opaque masking layer (and even of identical nature, for example a particularly black enamel).

In one embodiment, the opaque masking layer (or the other masking layer) and the camouflaging coating:

have their edge faces aligned, or even their main faces may face one another in part (lateral coverage over at most 50 mm)

are offset (the edge faces are offset, without contiguousness or coverage) by at most 100 μm in order to maintain this visual impression of a continuous opaque (black) strip.

In particular, the edge face of the camouflaging coating is spaced apart (laterally) by at most 100 μm from the gap in order not to see the interruption in opaqueness with the naked eye, and the edge face of the masking layer forming the edge of the gap is spaced apart (laterally) by at most 500 μm from the wall of the through-hole, if it is desired to limit the extent of the camouflaging coating.

In the specific case in which the opaque masking layer is a (PVB-based) ink deposited (printed) on the lamination interlayer (PVB), it may be preferred for the ink to be spaced apart from the edge of said through-hole by at least 1 cm in order to prevent delamination.

More broadly, in one advantageous embodiment, the glazing according to the invention comprises a masking zone which is opaque in the visible range or even at the working wavelength, present at the edge of the piece or of the through hole (for example along the upper longitudinal edge of the glazing, of the windscreen in particular), particularly an opaque masking zone which is spaced apart by at most 50 mm, 20 mm or 10 mm from the through-hole and optionally (if opaque at the working wavelength) absent from, or protruding by at most 20 mm or better still 10 mm or 5 mm into the zone of the through-hole (in particular in order to form a continuous or virtually continuous zone which is opaque in the visible range, seen from the outside, with the participation of the camouflaging coating on the piece) or even by at most 5 mm or 1 mm from the edge of the piece. This opaque masking zone may surround the through-hole (if closed).

The opaque masking zone may comprise:

a) a masking layer which is opaque in the visible range and at the working wavelength (peripheral to said glazing), preferably protruding by at most 10 mm or 5 mm into the zone of the through hole, or by at most 5 mm or 1 mm from the edge face of the piece which is in the form:

of at least one film which is opaque in its bulk or (as detailed above) of at least one coating on at least one of the first or second sheets, particularly F2 and/or F4, (and/)or on the lamination interlayer, or on a (transparent) submillimetric substrate between face F2 and face F3, b) and/or another camouflaging coating which is opaque in the visible range and is transparent at the working wavelength, particularly of a similar nature to said camouflaging coating, particularly on face F2 or even F3 or else on a (transparent) submillimetric substrate between face F2 and face F3 and even under the through-hole.

Like the camouflaging coating, the other camouflaging coating may comprise an organic matrix and a coloring agent, particularly organic, in particular organic pigment, dispersed in said matrix, coloring agent which absorbs the light located in said visible range and which is transparent at said working wavelength, camouflaging coating of submillimetric thickness and even of at most 30 µm. The coloring agent, particularly organic pigment, may represent between 0.1% and 10% by weight of the camouflaging coating, preferably between 0.2% and 3% by weight of said other camouflaging coating.

The camouflaging coating and the other camouflaging coating may be made of the same material with different percentages of components and/or thicknesses.

The other camouflaging coating may surround the through-hole (if closed).

The (transparent) substrate carrying the opaque masking layer or the other camouflaging coating may be polymeric or made of glass, particularly extra clear and/or tempered glass (preferably after the deposition of the opaque masking layer), in particular with a thickness of at most 0.3 mm or 0.2 mm. The substrate can therefore be an ultrathin glass (UTG).

The camouflaging coating on the piece will conceal a large part of the through-hole and even the detection system which would be face-to-face with the hole.

If the opaque masking layer (on face F2 and/or F4, etc.) does not extend sufficiently, for example does not mask the casing, the LIDAR, the system for attaching the LIDAR, the other camouflaging coating performs this function alone or in combination with the opaque masking layer.

The opaque masking layer and/or the other camouflaging coating (on face F2 and/or F3 and/or on a substrate) can further mask a zone referred to as camera zone, provided with sensor(s), in particular a camera in the visible range or in the far infrared range (thermal camera). Nevertheless, to this end, the opaque masking layer and/or the other camouflaging coating has a (closed or opening) gap in the zone provided for allowing the passage of light rays originating from the scene to be captured by the visible camera and/or a (closed or opening) gap in the zone provided for allowing the passage of rays originating from the scene to be captured by the thermal camera.

It is possible to provide different extents for the other camouflaging coating under face F3 and particularly spaced apart from the piece:

the other camouflaging coating is under face F3 beyond said through-hole, from the outside, extends the opaque masking layer or masks a gap of the peripheral opaque masking layer, the other camouflaging coating is under face F3 beyond said through hole, particularly from the outside, extends the opaque masking layer or masks a gap of the peripheral opaque masking layer, the other camouflaging coating has at least one opening or local discontinuity for allowing the passage of light rays, particularly for at least one additional sensor, in particular a sensor of a visible camera or thermal camera, in particular a camera attached to a holed plate in face F4 for allowing said light or electromagnetic rays (thermal camera) to pass.

The opaque masking zone (particularly the other camouflaging coating) can surround the chosen closed hole (present over the whole periphery of the closed hole), for example of a similar or homothetic shape to the hole. It can also be a simple geometric shape (rectangle, etc.) in which the closed hole is inscribed.

More generally, the glazing may comprise another camouflaging coating as described particularly according to b), forming a selective filter which absorbs in the visible range and is transparent at the working wavelength:

which is on face F2 or else on a submillimetric substrate (polymer or glass, particularly extra clear and UTG), between face F2 and face F3, facing toward said camouflaging coating (to adjust the appearance, etc.) and/or at the edge of the piece or even of the through-hole (to extend the camouflaging), and even extending under face F3 (central peripheral zone of the windscreen, for example)

and/or which is on a main face of another piece (particularly glass, transparent at least at a "working" wavelength, preferably of identical material or even thickness to said piece) in another through-hole of the second glass sheet (other piece with an edge face in contact with or spaced apart from the wall of the other hole by a distance of at most 5 mm and even of at most 3 mm).

Preferably, at least 80% or 90% or 95% of the surface of the through-hole or of the piece (and even 80% or 90% or 95% of the surface of the other through-hole or of the other piece) is offset from the masking zone which is opaque in the visible range (particularly layer according to a)).

The camouflaging coating may be defined by an L*1 particularly of at most 5, a*1 and b*1, parameters defined in the L* a* b* CIE 1976 color space. The opaque masking layer according to a) can also be defined by an L*2 particularly of at most 5, a*2 and b*2 with a color difference ΔE* between the camouflaging coating and the opaque masking layer which is given by the following formula:

$$\Delta E^* = \sqrt{\left(\Delta L^{*2} + \Delta a^{*2} + \Delta b^{*2}\right)}.$$

Preferably, ΔE* is less than 4, better still ΔE* is less than 2 (discerned with difficulty by the human eye), even better still ΔE* is less than 1 (not discerned by the human eye). Preferably, ΔL*<1. The other camouflaging coating may be defined by an L*3 particularly of at most 5, a*3 and b*3, parameters defined in the L* a* b* CIE 1976 color space.

The color different ΔE1* between the other camouflaging coating and the opaque masking layer a) may be less than 4, better still ΔE1* is less than 2 or than 1.

The color different ΔE2* between the other camouflaging coating and the camouflaging coating may be less than 2 or than 1.

Preferably, the camouflaging coating or even the other camouflaging coating has substantially the same color (black, etc.) as the peripheral opaque masking layer—according to a (black, etc.).

Preferably, the camouflaging coating or even the other camouflaging coating is defined by an optical density of at least 0.5 or even of at least 1 or even greater than or equal to 3, especially if it is located in a zone to be protected (adhesive bonding zone, etc.).

Preferably, the—peripheral—opaque masking layer (black, etc.) is particularly defined by an optical density of greater than or equal to 2 or 3, especially if it is located in a zone to be protected (adhesive bonding zone, etc.).

Preferably, with the interior surface comprising an element which is anti-reflective at said working wavelength, and particularly in the zone of said through-hole with the camouflaging coating, said glazing has a total transmission of at least 88% or 90.0% or 91% at the working wavelength.

The anti-reflective element may be an anti-reflective coating or the interior surface which is textured (surface treatment etc), particularly nanotextured.

For example, the piece carrying the anti-reflective coating has a refractive index n0 of 1.4 to 1.6 at 550 nm, and the anti-reflective coating has a refractive index n1 of at most 1.3±0.2 at 550 nm.

Preferably, the anti-reflective element comprises, or even consists of, an anti-reflective coating on the interior surface.

In particular:

the anti-reflective coating can comprise, or even consists of, a stack of thin dielectric layers (of oxide and/or of metal or silicon nitrides, for example) alternating high and low refractive indices at the working wavelength, particularly a stack obtained by physical vapor deposition, PVD.

or the anti-reflective coating can comprise, or even consists of, a layer of porous silica, particularly a sol-gel layer of nanoporous silica.

The anti-reflective coating can also comprise an overlayer if it does not alter the anti-reflective properties.

The anti-reflective coating, particularly of porous silica, according to the invention may have a thickness advantageously of between 50 nm and 1 μm even more preferentially between 70 and 500 nm or 300 nm.

In a first porous silica embodiment, the pores are the gaps of a non-compact stack of nanometric beads, particularly of silica, this layer being described for example in document US20040258929.

In a second porous silica embodiment, the porous layer is obtained by depositing a condensed silica sol (silica oligomers) densified by NH3-type vapors, this layer being described for example in document WO2005049757.

In a third porous silica embodiment, the porous layer can also be of the sol-gel type as described in document EP1329433.

In a fourth porous silica embodiment, the porous layer can also be of the sol-gel type as described in document WO2008/059170. The porous layer can thus be obtained with pore-forming agents which are preferably polymeric beads.

The layer of porous (or nanoporous) silica can have closed pores (smaller than the thickness of the layer) of at least 20 nm, 50 nm or 80 nm and preferably of at most 120 nm or 100 nm, optionally with pores having a concentration increasing in the direction of the free surface. The pores can have an elongated shape, particularly like a grain of rice. Even more preferentially, the pores can be substantially spherical or oval-shaped. It is preferred for the majority of the closed pores, or at least 80% of them, to have a substantially identical shape, particularly elongated, substantially spherical or oval-shaped. The porous silica layer, particularly sol-gel, can be obtained without high-temperature heat treatment (particularly without heat treatment of more than 300° C. or 400° C.).

The porous silica can be doped for example to further improve its hydrolytic content in the case of applications which require great strength (façades, exteriors, etc.). The doping elements can preferably be selected from Al, Zr, B, Sn, Zn.

The anti-reflective coating, particularly the layer of porous silica (sol-gel) can comprise a chemical protection underlayer particularly with a thickness of at most 200 nm for example, particularly a dense silica layer, by sol-gel with a sol-gel functional layer of porous silica on top. The underlayer can be based on silica or at least partially oxidized derivatives of silicon selected from silicon dioxide, sub-stoichiometric silicon oxides, oxycarbide, oxynitride or oxycarbonitride of silicon. The underlayer is useful when the underlying surface is made of soda-lime-silica glass because it acts as a barrier to the alkalis. This underlayer preferably has a thickness of at least 5 nm, particularly a thickness of between 10 nm and 200 nm, for example between 80 nm and 120 nm.

It is also possible to place an anti-reflective element (anti-reflective coating or textured surface) on face F1.

Face F1 may further comprise a functional layer: hydrophobic, etc.

Preferably, the laminated glazing comprises at most one functional (polymer or glass) film, particularly submillimetric (with or without coating on one or two faces) separate from the interlayer under said through-hole (and remote from the piece) and/or at most two or one functional coating under said through-hole (and remote from the piece), particularly on face F2.

In one embodiment, the laminated glazing is devoid of functional (polymer or glass) film, particularly submillimetric (with or without coating on one or two faces) separate from the interlayer under said through-hole (and remote from the piece) and even comprises at most one functional coating under said through-hole (and remote from the piece), particularly on face F2.

The through-hole is for example closed (as opposed to opening, such as a cavity made in the edge face of the second sheet), particularly spaced apart from the edge face of the second sheet by at least 2 cm, 5 cm, 10 cm or even more.

In particular, the through-hole opens out onto said upper longitudinal edge or edge face or is closed off (surrounded by the glass wall of the second sheet), particularly in the vicinity of the upper longitudinal edge face.

The (polymer or mineral, particularly glass) piece preferably has a thickness of at least 0.1 mm or 0.3 mm and if necessary of at least 0.7 mm and preferably of at most 3 mm or 2.2 mm or 2 mm or 1.1 mm, particularly the piece is smaller (in terms of width and/or surface area) than the through-hole. The thickness can be chosen based on the required level of transmission and/or the required safety enhancement, and the (polymer or mineral, particularly glass) piece may have an edge face in contact with or spaced apart from the wall delimiting the through-hole by at most 5 mm, preferably spaced apart and by a distance of at most 2 mm and even ranging from 0.1 mm or 0.3 mm to 5 mm or 3 mm or 2 mm. It is preferred for the piece to be spaced apart (empty or filled space), but not too much, to retain its safety function.

The piece can be curved (convex), following the curvature of the first glass sheet, particularly, the piece is curved and is a glass, particularly annealed or tempered, which follows the curvature of the first glass sheet.

The curved, particularly convex, piece (particularly made of glass) may have a thickness of at least 0.3 mm or 0.5 mm or 0.7 mm and follows the curvature of the first glass sheet. In one embodiment, this piece is bent simultaneously to the first and second glass sheets. The anti-reflective element is preferably produced before or during the bending. For example, it is an anti-reflective coating (precursor of sol-gel silica with pore-forming agent) which is heat treated (to eliminate the pore-forming agent) by virtue of the bending to have the anti-reflective function, for example to form nanopores. The camouflaging coating is preferably produced after the bending.

Examples of bending (of the glass sheets and/or of the piece) are unpressed or pressed gravity bending or else tempered or semi-tempered bending.

If the glass piece undergoes a tempering bending, the piece is curved and is tempered glass.

The piece, in particular made of glass, may be cold curved (bent) (due to its flexibility), for example for a piece with a thickness of at most 0.9 mm or 0.7 mm. The curved piece (particularly made of glass) may for example have a thickness of less than 0.7 mm (and of at least 0.1 mm or 0.2 mm or 0.3 mm) and follows the curvature of the first glass sheet. In one embodiment, this piece is flexible and is curved following the curvature of the first glass sheet for example during the assembly before lamination (and after the bending of the first and second glass sheets). The piece may also independently undergo a heat treatment (optionally for bending), and a tempering operation. Thus, the piece may be made of (thin) tempered, and even curved, glass. The anti-reflective element is preferably produced during said heat treatment. For example, it is a coating (precursor of sol-gel silica with pore-forming agent) which is heat treated (to eliminate the pore-forming agent) for example during the bending to have the anti-reflective function, for example to form nanopores. The camouflaging coating is preferably produced after the heat treatment.

As examples of thin glass, mention may be made of the Gorilla® glasses from Corning, aluminosilicate glass and optionally chemically tempered glass.

More broadly, the piece may be polymeric or mineral. It preferably comprises at least 90% or 95 or 99% or 100% by weight of mineral material.

The piece may be made of glass, preferably extra clear, particularly annealed or (thermally) tempered or chemically tempered or else without a heat treatment. The annealing may result from the method for manufacturing the anti-reflective coating which comprises a layer of porous silica (elimination of pore-forming agent and/or densification of the layer, particularly). The temperature for bending the piece may serve to form the layer of silica (elimination of pore-forming agent and/or densification of the layer, particularly).

The piece may be a silica-based, soda-lime-based, soda-lime-silica-based, or aluminosilicate-based, or borosilicate-based glass, and in particular extra clear. The piece may have a total iron oxide content by weight (expressed in the form $Fe_2O_3$) of at most 0.05% (500 ppm), preferably of at most 0.03% (300 ppm) and of at most 0.015% (150 ppm) and particularly greater than or equal to 0.005%.

The piece may be made of K9 borosilicate or BK7 fused silica glass or else made of glass described in applications WO2014128016 or WO2018015312 or WO2018178278.

The piece, particularly curved following the curvature of the first glass sheet may be made of glass, in particular tempered glass, having a total iron oxide content by weight of at most 0.05%, in particular extra clear glass, particularly soda-lime-silica glass and particularly of identical (or similar) composition to the composition of the glass of the first glass sheet, particularly soda-lime-silica.

The camouflaging coating which is on the connecting surface may be:

in (direct) adhesive contact with face Fb (solid or partially holed interlayer, single or multi-laminations, preferably PVB), or coated with a functional layer (deposited on top by any means, such as PVD or the liquid route), which is in contact with face Fb.

At least a fraction of the thickness of the piece (for example at least 0.3 mm) is in the through-hole, and even the thickness of the piece is in the through-hole.

The connecting surface may be flush under face F3 (particularly lamination interlayer with partial hole or locally reduced thickness) or flush with face F3 or flush over face F3 (in the through-hole). And/or the interior surface may be flush under (in the through-hole), flush with or flush over face F4.

The lamination interlayer can comprise a PVB, optionally comprising PVB/functional film such as polymer film with athermal coating/PVB, optionally acoustic PVB, PVB optionally having an interlayer through-hole or a partial interlayer hole in line with the through-hole, particularly the connecting surface being connected to face Fb.

The interlayer through-hole or partial interlayer hole may be wider than the through-hole.

If the interlayer hole is a through-hole, the camouflaging coating is connected by the thermoplastic connecting film to face F2 or by a (thermosetting) adhesive.

The lamination interlayer can comprise another functional plastic film (transparent, clear or tinted), for example preferably a polyethylene terephthalate PET film carrying a layer that is athermal, electrically conductive, etc., for example there is the sequence PVB/functional film/PVB between faces F2 and F3.

The other plastic film can have a thickness of between 10 and 100 μm. The other plastic film can more broadly be made of polyamide, polyester, polyolefin (PE: polyethylene, PP: polypropylene), polystyrene, polyvinyl chloride (PVC), polyethylene terephthalate (PET), polymethyl methacrylate (PMMA) or polycarbonate (PC). A clear film is preferred, in particular PET.

Without departing from the scope of the invention, the lamination interlayer clearly can comprise several different types of laminations made of thermoplastic material, for example, with different hardnesses in order to provide an acoustic function, as disclosed, for example, in publication U.S. Pat. No. 6,132,882, particularly a set of PVB laminations with different hardnesses. Similarly, one of the glass sheets can be thin compared to the thicknesses conventionally used.

According to the invention, the interlayer can have a wedge-shape, particularly in view of an HUD (Head Up Display) application.

As a common lamination interlayer, other than PVB, a flexible polyurethane PU, a thermoplastic without plasticizer such as ethylene-vinyl acetate copolymer (EVA), an ionomer resin can be cited. These plastics have a thickness, for example, of between 0.2 mm and 1.1 mm, particularly 0.3 and 0.7 mm.

The space between the piece and the wall can be filled fully or in part (or not) with a filling material (organic and/or inorganic), optionally adhesive (particularly resin, particularly thermosetting, hot melt, for example two-component polyurethane, epoxy, etc.). The thickness of this material is for example less than the thickness of the second sheet and/or of the piece.

The glazing may comprise an insert between the wall of the through-hole and the piece, particularly a closed insert if the through-hole is closed. An insert (annular, of ring type, etc.), for example made of flexible polymer material (polycarbonate etc.) may be housed in, mounted on (particularly adhesively bonded or force-fitted) to the wall of the second glass sheet:

to serve as mechanical reinforcer, and/or for the attachment of a piece or an optical module between the piece and the infrared detection system (LIDAR, etc.), this insert being able to extend beyond the through-hole, particularly on face F4.

The insert according to the invention is preferably spaced apart from the infrared detection system (LIDAR, etc.) and does not serve for the attachment of same.

As already indicated, the laminated glazing according to the invention may comprise another (closed or opening) through-hole of the second glass sheet delimited by another wall provided with another piece (particularly of identical or similar nature and/or shape to said piece), which is transparent at least at the working wavelength in the infrared, which other piece is of a thickness of at least 0.3 mm, which other piece with an edge face in contact with or spaced apart from the wall of the other hole by a distance of at most 5 mm and even of at most 3 mm. The other piece may have a camouflaging coating forming a selective filter which absorbs in the visible range and is transparent at the working wavelength, in particular similar to said camouflaging coating of said piece.

For example:

said through-hole is opening, and the other through-hole is closed both holes are closed.

The holes may be of similar size.

The opening or closed through-hole (and even the other hole) may have a constant or variable surface (cross) section Sc, particularly trapezoidal or rectangular or disk-shaped or oval, for example has a smallest dimension (in diameter or vertically) of at least 2 cm, 3 cm, 5 cm and preferably a largest dimension (particularly horizontally) or at most 70 cm or 30 cm or 25 cm or 20 cm.

For example, the through-hole faces the receiver of the LIDAR, and the other through-hole faces the transmitter of the LIDAR.

The through-hole (and even the other hole) is preferably in a peripheral region, preferably the upper part of the glazing (in installed position), and even in a peripheral central region. The through-hole (and even the other hole) is in particular located in one region and take up less than 10% or even less than 1% of the glazing. For example the lower edge of the through-hole is at most separated by 50 cm from the upper longitudinal edge face of the glazing.

The through-hole can be:

closed hole (surrounded by the wall of the second glass sheet), therefore within the glazing particularly spaced apart from the closest edge face of the glazing by at least 3 cm or 5 cm open or opening, forming a notch (peripheral).

The shape and dimensions of the through-hole (and even of the other hole) are configured according to the techniques of the art in order to effectively and selectively collect all the radiation passing through the glazing (windscreen, window, etc.), particularly in the case of LIDAR the radiation reflected from a solid angle range outside the vehicle and coming from the area in front of the vehicle that is to be captured via the LIDAR.

The through-hole (and even the other hole) may have rounded corners.

If the through-hole is a notch a part of this notch will be masked by the frame of the glazing and thus be non-functional for the infrared detection system. If the hole is closed it is too close to the edge and the same applies.

If the through-hole is closed, the edge of the through-hole closest to the edge face of the glazing (preferably upper longitudinal edge and particularly in a central zone) is spaced apart from this edge face of the glazing (of the second sheet) preferably by at least 2 cm or 3 cm and better still 5 cm.

The through-hole can be in the central zone of the upper longitudinal edge of the windscreen, the usual zone of the interior rearview mirror (rearview mirror adjacent to the through-hole or rearview mirror eliminated depending on the vehicle), zone where a masking layer on face F2 and/or connected to the interlayer is generally wider than on the adjacent lateral zones along the upper longitudinal edge (passenger, driver, etc.).

The through-hole (and even the other hole) is preferably longer than it is high.

Preferably, the through-hole (and even the other hole) has a horizontal dimension, referred to as length L1 (parallel to the upper longitudinal edge) and a vertical dimension of the hole, referred to as height H1 (perpendicular to the upper longitudinal edge), the length L1 is greater than the height H1.

In particular, the section of the hole (and even of the other hole) is a quadrilateral, particularly rectangular or trapezoid, with:

a first (large) "upper" longitudinal side (closest to the edge face of the upper longitudinal edge of the glazing)—of length L1a preferably of at most 30 cm, 20 cm, or 15 cm or 12 cm a second so-called lower (large) longitudinal side (farthest from the edge face of the upper longitudinal edge of the glazing, closer to the central zone) preferably parallel to the edge face of the upper longitudinal edge of the glazing and of a length L1b preferably of at most 35 cm or 30 cm or 25 cm or 20 cm and preferably greater than that of the first large side of a height (between these first and second large sides) preferably of at least 5 cm and even of at most 15 cm.

If the hole is closed, the first (large) "upper" longitudinal side is preferably parallel to the edge face of the upper longitudinal edge of the glazing and particularly spaced apart by at least 5 cm or 6 cm from the edge face (of the upper longitudinal edge of the glazing).

If the hole is open (notch), the first (large) "upper" longitudinal side is preferably defined as the upper edge of the emptied zone.

A central line M is defined passing through the middle of the upper edge which can be an axis of symmetry of the glazing. The through-hole can be central, then the line M passes through the through-hole and divides it into two, particularly identical, parts.

If the through-hole serves for an SWIR camera in the passenger compartment, it has for example a minimum size of 5 cm long and 2 cm high to a maximum size of 25 cm long and 6 cm high.

In one embodiment, the glazing comprises a heating zone (by wire(s), by layer) which takes up all or part of the surface of the glazing, conventionally made of a material that is transparent in the visible range but not necessarily transparent enough at the infrared working wavelength of the infrared detection system (LIDAR, etc.) in a range extending from 800 nm to 1800 nm, in particular between 850 nm and 1600 nm. In particular there can be a first "main" heating zone, extending over all or part of the glazing optionally outside the zone in front facing the through-hole and facing said optional other through-hole.

It may however be desirable for the infrared communication window in the zone of the through-hole (and the other optional communication window if there is another hole) to be protected against frost and mist particularly by heating.

This can be done by one or more heating metal wires located facing the through-hole or even in the vicinity thereof or even by one or more heating wires extending over all or part of the glazing. The arrangement of the one or more wires can make it possible to maintain overall transparency at the infrared working wavelength.

This can also be done by a local heating layer facing the through-hole made of a material that is transparent at the infrared working wavelength.

In one embodiment, the glazing according to the invention can comprise at least one metal wire (a coiled wire, for example) particularly heating, connected to the lamination interlayer, within the lamination or particularly on the side of face Fb particularly anchored on face Fb (or even on the side of Fa, anchored on Fa) and optionally absent facing said through-hole and said optional other through-hole.

It may be sought to avoid the heating wire or wires facing the through-hole and/or said optional other through-hole for reasons of optical distortions.

More specifically, it is possible to have a local heating zone under and/or in said through-hole, spaced apart from or on the connecting surface, particularly by an arrangement of tracks or wire(s) (wire(s), etc.) of a material, particularly absorbent—which arrangement is for keeping the overall transparency—at the working wavelength in the infrared or by a heating layer made of electrically conductive material which is transparent at the working wavelength in the infrared, particularly organic (ink, conductive polymer) or inorganic.

The local heating zone can be connected to at least two electrical leads which are in particular one or more flat connectors or (in the case of a heating layer) electrically conductive busbars intended for connecting to a voltage source so that a current path for a heating current is formed therebetween. It is not always necessary to have busbars in the case of heating wire(s) for which a flat connector (useful for point contacts such as wires) can be used.

The two electrical leads are preferably masked from the outside by a masking layer which is opaque in the visible range (or even in the near infrared at the working wavelength), particularly such as that mentioned above according to a) or b), particularly the other camouflaging coating on face F2 or a substrate, or even masked by the camouflaging coating if on the piece.

The heating layer can have a sheet resistance of at most 500 or 300 or 100 or 50 or even 30 ohms per square. The heating layer is for example mineral, based The heating layer and even the infrared transmission zone in particular may be devoid of metal layer which absorbs and/or reflects the near infrared at the working wavelength (or at least of a thickness of at most 10 nm or 5 nm or 3 nm).

The heating layer may be on the connecting surface with two electrical leads and the heating layer is preferably on the camouflaging coating.

The camouflaging coating may be on the same main face as the heating coating, particularly the connecting surface, for example lying thereunder in order to promote establishing electrical contact at the electrical leads (of the two busbars).

The camouflaging coating may be on a main face opposite the heating coating, in particular camouflaging coating, on the connecting surface and heating coating on the interior surface lying under an anti-reflective coating.

The heating layer can be spaced apart from the connecting surface, particularly under the through-hole and extending under face F3, with optionally the two electrical leads (two local busbars) all or in part offset from the through-hole, under face F3.

The two electrical leads (two local busbars) offset from the through-hole are preferably masked from the outside by a masking element:

coating and/or film which is opaque (in the visible range and the near infrared at the working wavelength) on face F2, such as an enamel (screenprinting, etc.) or on or in the lamination interlayer, such as an ink (printed) the other camouflaging coating on face F2 or the substrate (UTG, etc.).

The two current supplies (two local busbars) offset or on the connecting surface are preferably remote by at most 1 cm from the walls of the through-hole.

Preferably, the two current supplies (two local busbars) are on either side of the through-hole.

The local heating zone, in particular the local heating layer, can extend beyond the through-hole for example over at most 30 mm. It can have the same shape as the through-hole, particularly homothetic (trapezoidal etc.) or even any other shape, for example rectangular (and trapezoidal hole). The two electrical leads (local busbars or flat connector(s)) are thus preferably all or in part offset from the through-hole under face F3 and even masked from the outside, as already described.

In the case of another through-hole, it is possible to have another separate local heating zone or a common local heating zone.

It is possible in particular to have:

an optional main heating zone with at least two electrical leads typically in the peripheral zone of the glazing (on the same edge, on two opposite edges or even two adjacent edges of the glazing), for example by an electrically conductive heating coating (holes in line with the through-hole)

the local heating zone with at least two electrical leads or local busbars ("omni" busbar), first and second busbars preferably masked from the outside as mentioned above.

One or the busbars (local) can be continuous or discontinuous by sections.

Preferably, the two electrical leads are two (local) busbars in the form of particularly rectangular strips which are (at least in part), preferably outside the zone of the through-hole.

The width of the busbars (local) is preferably from 2 mm to 30 mm, in a particularly preferred way from 4 mm to 20 mm and in particular from 10 mm to 20 mm.

A busbar (local) particularly in a layer (printed) preferably contains at least one metal, a metal alloy, a metal and/or carbon compound, in particular preferably a noble metal and, in particular, silver. For example, the printing paste preferably contains metal particles, metal and/or carbon particles and, in particular, noble metal particles such as silver particles. The thickness of a layer busbar (printed) can preferably be from 5 μm to 40 μm, in a particularly preferred way from 8 μm to 20 μm and more particularly preferably from 8 μm to 12 μm.

Alternatively, however, it is possible to use for one or each busbar (local) an electrically conductive sheet, particularly a strip, for example rectangular. The busbar then contains, for example, at least aluminum, copper, tinned copper, gold, silver, zinc, tungsten and/or tin or alloys thereof. This sheet busbar (strip) preferably has a thickness of 10 μm to 500 μm, in a particularly preferred way of 30 μm to 300 μm.

The sheet busbar is in particular used for the heating wires bonded to the lamination interlayer.

The first busbar is preferably (substantially) horizontal and closest to the upper longitudinal edge of the glazing and the second busbar is then preferably (substantially) horizontal, first and second busbar on either side of the through-hole.

The length of the busbars is adapted in a tailored manner, for example equal to or longer than the sides of the through-hole facing toward them.

It is sought to bring the busbars as close together as possible to increase the power density in the transparent heating layer.

The supply of power of the (first, second) busbars can be provided wirelessly and/or with a connector (wires, flat connectors, etc.).

The busbars can be lateral, that is to say to the left and right of the through-hole along the lateral edges of the glazing.

The first busbar can be preferably lateral (vertical or oblique) and the second busbar is then preferably (substantially) lateral (vertical or oblique), first and second busbar on either side of the first through-hole.

In the case of a round or oval through hole, the busbars (substantially horizontal or lateral, common or dedicated busbars) can be curved to match the shape of the through-hole.

For busbars under and/or offset from the through-hole, vertical or oblique lateral busbars (parallel with respect to the small sides of the through-hole) may be preferred since the horizontal busbars can generate local overthicknesses that promote distortions.

The local heating zone and/or overall heating zone comprises for example one or a plurality of individual metal wires, referred to as "heating metal wires" which connect the "busbars" to one another. The heating current passes through these individual metal wires.

In particular, the glazing can comprise at least one first metal wire (a coiled wire for example), particularly heating, connected to the lamination interlayer facing the through-hole particularly:

on the side of face Fb particularly anchored on face Fb or within the lamination interlayer between a first lamination (on the side of face F2) and second interlayer (on the side of face F3), laminations of identical or different thicknesses, etc.

or even particularly on the side of face Fa particularly anchored on face Fa.

The heating wire or wires particularly have a thickness less than or equal to 0.1 mm preferably made of copper, tungsten, gold, silver or aluminum or alloys of at least two of these metals.

The wire or wires are advantageously very thin so as not to impair, or only very slightly impair, the transparency of the glazing. Preferably, the metal wires have a thickness less than or equal to 0.1 mm, in particular between 0.02 and 0.04 mm and ideally between 0.024 mm and 0.029 mm. The metal wire or wires preferably contain copper, tungsten, gold, silver or aluminum or an alloy of at least two of these metals. The alloy can also contain molybdenum, rhenium, osmium, iridium, palladium or platinum.

The metal wire or wires are preferably electrically insulated.

In one embodiment, the glazing according to the invention comprises a functional element connected to the lamination interlayer:

particularly on one of faces Fa or Fb of the lamination interlayer (single or multi-laminations)

or within said lamination interlayer, between a first sheet and second interlayer sheet.

The (flexible, curved) functional element—of submillimetric thickness, particularly of at most 300 µm or 200 µm—comprising a (transparent) sheet, particularly (flexible) polymer or glass (for example 100 µm PET or else extra clear glass such as a 100 µm UTG), particularly conductive polymer. Preferably, on the sheet (on a first main face oriented toward face F2 or F3), at least one coating is present, particularly an electrically conductive coating (transparent in the visible range), particularly forming a heating layer (such as that mentioned above) or which is a masking layer which is opaque in the visible range (according to a) or b) as mentioned above).

The functional element has a first zone facing the through-hole, in the first zone said functional element being transparent at said working wavelength, particularly a local heating element or selective filter, preferably with the electrically conductive coating.

It is possible to envisage a functional element that is opaque at the working length (film and/or coating on top) outside the zone of the through-hole (and of the optional other zone of the other through-hole). The sheet, particularly polymeric, may have an opaque zone in its bulk next to a transparent zone in line with the through-hole.

Outside the zone of the through-hole (and of the optional other zone of the other through-hole), this functional (heating) element is for example opaque or made opaque in the visible range. For example it extends a peripheral masking layer (enamel for example) particularly on face F2 or on the interlayer (ink) which is a strip in order to create (viewed from the outside a widened opaque zone particularly in the central zone.

This functional element can be local, in the region of the through-hole (taking up a fraction of the glazing surface) and can take up less than 30, 10%, 5% of the glazing.

The functional element can have any general rectangular or square shape, identical and even homothetic to the shape of the through-hole.

The distance between the upper longitudinal edge and the functional element can be at most 30 mm, 20 mm 15 and even 10 mm.

In particular:

the functional element (the sheet) comprises, on the first main face oriented toward face F2 or F3, an electrically conductive coating forming a (local) heating layer facing the through-hole—thereby defining the local heating zone which is transparent at said working wavelength and/or the functional element (the sheet) comprises, on the first main face or the second, opposite, main face an opaque masking element at least partially offset from the through-hole and particularly absent from or protruding by at most 50 mm or 20 mm or 10 mm or 5 mm into the through-hole or by at most 3 mm or 1 mm from the edge face of the piece.

or another camouflaging coating forming a selective filter which absorbs in the visible range and is transparent at the working wavelength on an edge zone of the piece or even of the through-hole and/or in the through-hole.

The opaque zone of the opaque masking element can take up substantially the entire surface of the functional element, or at least 80% or 90% and with an opening in line with the through-hole. The dimensions of the opening can be smaller, equal to or greater than those of the through-hole.

The opaque masking element (connected opaque film or coating) can protrude into the through-hole particularly by at most 20 mm, 10 mm, and/or by at most 5 mm or 1 mm from the edge of the piece.

The electrically conductive coating (heating or not) can also take up substantially the entire surface of the film (of the sheet) or at least 50%. The busbars connected to the conductive coating are preferably outside the first zone but in the vicinity, preferably for example at less than 1 cm.

The sheet of the functional element can be polymeric, particularly with a thickness of between 10 and 100 μm. The plastic film can more broadly be made of polyamide, polyester, polyolefin (PE: polyethylene, PP: polypropylene), polystyrene, polyvinyl chloride (PVC), polyethylene terephthalate (PET), polymethyl methacrylate (PMMA) or polycarbonate (PC). A clear film is preferred, in particular PET.

Offset from the zone of said through-hole (or of another through-hole), the functional element (the sheet, particularly polymeric or glass) can comprise on the first main face (on the side of the particularly electrically conductive or opaque coating) or a face opposite one or more other elements in particular moisture sensors, rain sensor, light sensor (photodiode), sensor forming an antenna, for receiving and/or transmitting electromagnetic waves (radio, TV, particularly a local communication network such as BLUETOOTH, WIFI, WLAN), an acoustic sensor (based on a piezoelectric element), an ultrasound signal detector, a diagnostic sensor, a command detector (windscreen wiper etc.), for example IR command or voice command (piezoelectric), an electroluminescent screen (organic or inorganic, liquid crystal, etc.).

The number of openings of the functional element is adapted according to the number of sensors and camera, screen(s), requiring it.

The other element(s) are preferably masked from the outside by another camouflaging coating or an opaque masking layer on face F2 or by the opaque masking element or the other camouflaging coating on the sheet, the other element(s) are preferably on the side of face F3.

The first glass sheet can comprise, on face F2, a functional coating with a first zone facing the through-hole, which functional coating is transparent at said "working" wavelength in the first zone, particularly a heating layer or another camouflaging coating (as already described), particularly protruding over an edge zone of the through-hole by at most 50 mm or 10 mm or 5 mm or protruding over an edge zone of the piece by at most 5 mm or 1 mm.

The glazing can thus comprise, on face F2 (or on face F3 or else on a polymer film between face F2 and F3) a functional layer, extending over all or part of the glazing, particularly a transparent (in the visible range) electrically conductive, optionally heating layer, in particular a silver stack, or else an opaque masking layer, particularly an enamel, which functional layer absorbs at the working wavelength in the infrared, and which is absent from said through-hole at least in the central zone and at the edge of the through-hole between face F2 and Fa, particularly by means of a gap or of the through-hole if on face F3)

and/or a functional coating is on face F2, transparent at the working wavelength, is facing the through-hole, particularly local heating layer (as mentioned above) or camouflaging coating forming selective filter (as mentioned above), optionally being in contact with said functional layer, particularly on or under the functional layer The functional layer can then have a gap in line with said through-hole (at least in the central zone) and preferably which protrudes by at most 50 mm, 30 mm or 20 mm or 10 mm, 7 mm or 5 mm in said through-hole.

The transparent electrically conductive functional layer (solar control and/or heating) can comprise a stack of thin layers comprising at least one metal functional layer such as silver (on F2 or preferably F3 or on a polymer film). The or each functional (silver) layer is arranged between dielectric layers.

The functional layers preferably contain at least one metal, for example, silver, gold, copper, nickel and chromium or, or a metal alloy. The functional layers in particular preferably contain at least 90% by weight of metal, in particular at least 99.9% by weight of metal. The functional layers can be made of metal for the metal alloy. The functional layers contain in a particularly preferred manner silver or an alloy containing silver. The thickness of a functional layer (silver, etc.) is preferably from 5 nm to 50 nm, more preferentially from 8 nm to 25 nm. A dielectric layer contains at least one individual layer made of a dielectric material, for example, containing a nitride such as silicon nitride or an oxide such as aluminum oxide. The dielectric layer can however also contain a plurality of individual layers, for example, individual layers of a dielectric material, layers, smoothing layers, which corresponds to blocking layers and/or "anti-reflective" layers. The thickness of a dielectric layer is, for example, from 10 nm to 200 nm. This layer structure is generally obtained by a series of deposition operations that are carried out by a vacuum process such as field-supported magnetic cathode sputtering.

The transparent electrically conductive layer is a layer (single-layer or multi-layer, thus a stack) preferably with a total thickness less than or equal to 2 μm, in a particularly preferred way less than or equal to 1 μm.

Naturally, the most desirable application is that the glazing be a windscreen for a road vehicle (automobile) or even for a rail vehicle (moderate speed).

The interior and/or exterior glass may have undergone a chemical or heat treatment of the hardening or annealing type or may have undergone tempering (particularly in order to obtain better mechanical strength) or can be semi-tempered.

The glass of the first glass sheet and/or of the second glass sheet is preferably of the float glass type, that is to say obtainable by a method consisting in pouring molten glass onto a bath of molten tin (called a "float" bath). The terms "atmosphere" and "tin" faces are understood to mean those faces that have been in contact with the atmosphere in the float bath and in contact with the molten tin respectively. The tin face contains a small surface amount of tin that has diffused into the structure of the glass.

The same applied for the piece which can be made of float glass. The interior surface (with a reflective element, coating, etc.) can equally be the "tin" face or the "atmosphere" face.

The second glass sheet is particularly green, blue, gray. The second glass sheet can be green by the $Fe_2O_3$ or blue with CoO and Se or gray with Se and CoO.

The glasses of the applicant called TSAnx (0.5 to 0.6% iron) TSA2+, TSA3+(0.8 to 0.9% iron), TSA4+(1% iron), TSA5+, for example green, can be particularly mentioned.

TSA3+(2.1 mm) for example has a total transmission at 905 mm of about 40% and at 1550 mm of about 50%.

The second glass sheet can have a redox, defined as being the ratio between the content by weight of FeO (ferrous iron) and the total iron oxide content by weight (expressed in the form $Fe_2O_3$) between 0.22 and 0.35 or 0.30.

Said second glass sheet can have a chemical composition that comprises the following constituents in a content varying within the limits by weight defined hereinafter:

| | |
|---|---|
| $SiO_2$ | 64-75% |
| $Al_2O_3$ | 0-5% |
| $B_2O_3$ | 0-5%, |
| CaO | 2-15% |
| MgO | 0-5% |
| $Na_2O$ | 9-18% |
| $K_2O$ | 0-5% |
| $SO_3$ | 0.1-0.35% |

$Fe_2O_3$ (total iron) at least 0.4% and even 0.4 to 1.5%,

Optionally redox 0.22-0.3

And particularly less than 0.1% impurities.

The first glass sheet can for example be a soda-lime-silica glass such as Saint-Gobain Glass's Diamant®, or Pilkington's Optiwhite®, or Schott's B270@, or AGC's Sunmax® or of other composition described in document WO04/025334. The Planiclear® glass from the Saint-Gobain Glass company can also be chosen.

The laminated glazing according to the invention, in particular for a private car (windscreen etc.) or truck, can be curved (bent) in one or more directions particularly with, for the first sheet, the second sheet and optionally the piece, a radius of curvature of 10 cm to 40 cm. It can be flat for buses, trains, tractors.

With ordinary natural raw materials, the total content by weight of iron oxide is of the order of 0.1% (1000 ppm). To reduce the iron oxide content, particularly pure raw materials can be selected.

In the present invention, the $Fe_2O_3$ content (total iron) of the first glass sheet is preferably less than 0.015%, even less than or equal to 0.012%, particularly 0.010%, in order to increase the near-infrared transmission of the glass. The $Fe_2O_3$ content is preferably greater than or equal to 0.005%, particularly 0.008% so that the cost of the glass is not a disadvantage.

In order to further increase the infrared transmission of the first glass sheet, the ferrous iron content can be reduced in favor of the ferric iron, thus oxidizing the iron present in the glass. Thus, the desire is for glasses having the lowest possible redox, ideally zero or nearly 0. This number can vary between 0 and 0.9 of zero redoxes corresponding to a totally oxidized glass.

Glasses comprising low quantities of iron oxide, particularly less than 200 ppm, even less than 150 ppm, have a natural tendency to have high redoxes, greater than 0.4, even 0.5. This tendency is probably due to the displacement of the oxidation-reduction equilibrium of the iron based on the content of iron oxide. The redox of the first glass sheet is preferably greater than or equal to 0.15, and particularly between 0.2 and 0.30, particularly between 0.25 and 0.30. In fact, excessively low redoxes contribute to reducing the working life of the furnaces.

In the glasses according to the invention (first and second sheet and even the piece), the silica $SiO_2$ is generally maintained within narrow limits for the following reasons. Above 75%, the viscosity of the glass and its aptitude for devitrification increase greatly, which makes its melting and pouring onto the molten tin bath more difficult. Below 60%, particularly 64%, the hydrolytic resistance of the glass decreases rapidly. The preferred content is between 65 and 75%, particularly between 71 and 73%.

Said first glass sheet can have a chemical composition that comprises the following constituents in a content varying within the limits by weight defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | 0.1-0.4% |
| $Fe_2O_3$ (total iron) | 0 to 0.015%, |
| and redox | 0.1-0.3. |

Throughout the text, the percentages are percentages by weight.

The piece can have a chemical composition that comprises the following constituents in a content varying within the limits by weight defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | 0.1-0.4% |
| $Fe_2O_3$ (total iron) | 0 to 0.015%, |
| and redox | 0.1-0.3. |

The glass composition of the first glass sheet can comprise, other than the inevitable impurities contained particularly in the raw materials, a small proportion (up to 1%) of other constituents, for example agents aiding in the melting or refining of the glass (CI . . . ), or still elements resulting from the dissolving of the refractories used in the construction of the furnaces (for example $ZrO_2$). For the reasons already mentioned, the composition according to the invention preferably does not comprise oxides such as $Sb_2O_3$, $As_2O_3$ or $CeO_2$.

The composition of the first glass sheet preferably does not comprise any infrared absorbing agent (particularly for a wavelength comprised between 800 and 1800 nm). In particular, the composition according to the invention preferably does not contain any of the following agents: oxides of transition elements such as CoO, CuO, $Cr_2O_3$, NiO, $MnO_2$, $WO_5$, rare earth oxides such as $CeO_2$, $La_2O_3$, $Nd_2O_3$, $Er_2O_3$, or coloring agents in elemental state such as Se, Ag, Cu. Among the other agents also preferably excluded are oxides of the following elements: Sc, Y, Pr, Sm, Eu, Gd, Tb, Dy, Ho, Tm, Yb, Lu. These agents often have a very powerful undesirable coloring effect, appearing at very small quantities, sometimes on the order of a few ppm or less (1 ppm=0.0001%). Their presence thus very greatly reduces the transmission of the glass.

In the glasses according to the invention (first sheet, second sheet and even the piece), the silica $SiO_2$ is generally maintained within narrow limits for the following reasons. Above 75%, the viscosity of the glass and its aptitude for devitrification increase greatly, which makes its melting and pouring onto the molten tin bath more difficult. Below 60%, particularly 64%, the hydrolytic resistance of the glass decreases rapidly. The preferred content is between 65 and 75%, particularly between 71 and 73%.

The invention also relates to a device, which comprises:
the laminated glazing as previously described
an infrared detection (vision) system at the working
wavelength in the infrared (or even multi-spectral, also
in the visible range, particularly between 500 and 600
nm), arranged in the passenger compartment (behind
said glazing) and comprising a transmitter and/or
receiver, so as to transmit and/or receive radiation
passing through the laminated glazing at the through-
hole with the piece.

The infrared detection system is preferably a LIDAR or a
near-infrared camera (SWIR, short-wave infrared).

The infrared detection system may be a LIDAR of various
technologies. It makes it possible to measure the vehicle's
environment by determining the distance of the object
closest to the vehicle in a wide range of angular directions.
Thus, the vehicle's environment can be reconstituted in 3D.
The technology employed is based on sending a light beam
and receiving it after it has diffusely reflected off an obstacle.
This can be done by a rotating source, scanned by micro-
electromechanical systems (MEMS) or by a fully solid
system. A single flash of light can thus illuminate the whole
environment.

For all these technologies, the light must pass through the
glazing twice, when outgoing and when incoming, which
explains the necessity to have a glazing with excellent
transparency at the working wavelength of the LIDAR.

The speed can also be measured with DOPPLER tech-
nology.

The infrared detection system (LIDAR for example) is
preferably spaced apart from the anti-reflective element.

The piece according to the invention is preferably spaced
apart from the infrared detection system (LIDAR, etc.)
and/or does not serve for the attachment of same. The
infrared detection system (LIDAR, etc.) can be facing or set
back from said through-hole (and from the piece), for
example an optical system is between the piece and the
infrared detection system (LIDAR, etc.).

The infrared detection system (LIDAR, etc.) is for
example attached via face F4 and/or the bodywork, the roof
trim. The infrared detection system (LIDAR) can be set
back.

The infrared detection system (LIDAR, etc.) is for
example integrated in a plate or a multifunction base able to
(designed to) optimize the positioning thereof relative to the
windscreen and the piece by being adhesively bonded to
face F4.

Some advantageous but non-limiting embodiments of the
present invention are described hereafter, which of course
can be combined as appropriate. The views are not to scale.

FIG. 1 shows schematically a windscreen of a vehicle
particularly a motor vehicle 100a according to the invention,
with an infrared vision system such as a LIDAR at 905 nm
or 1550 nm comprising a transmitter/receiver 7 or else for an
SWIR camera.

FIG. 2a shows a schematic front view (passenger com-
partment side) of the windscreen 100a of the first embodi-
ment of the invention.

FIG. 2c shows a schematic front view (passenger com-
partment side) of the windscreen 100b in a second variant of
the first embodiment of the invention.

Figure 1:
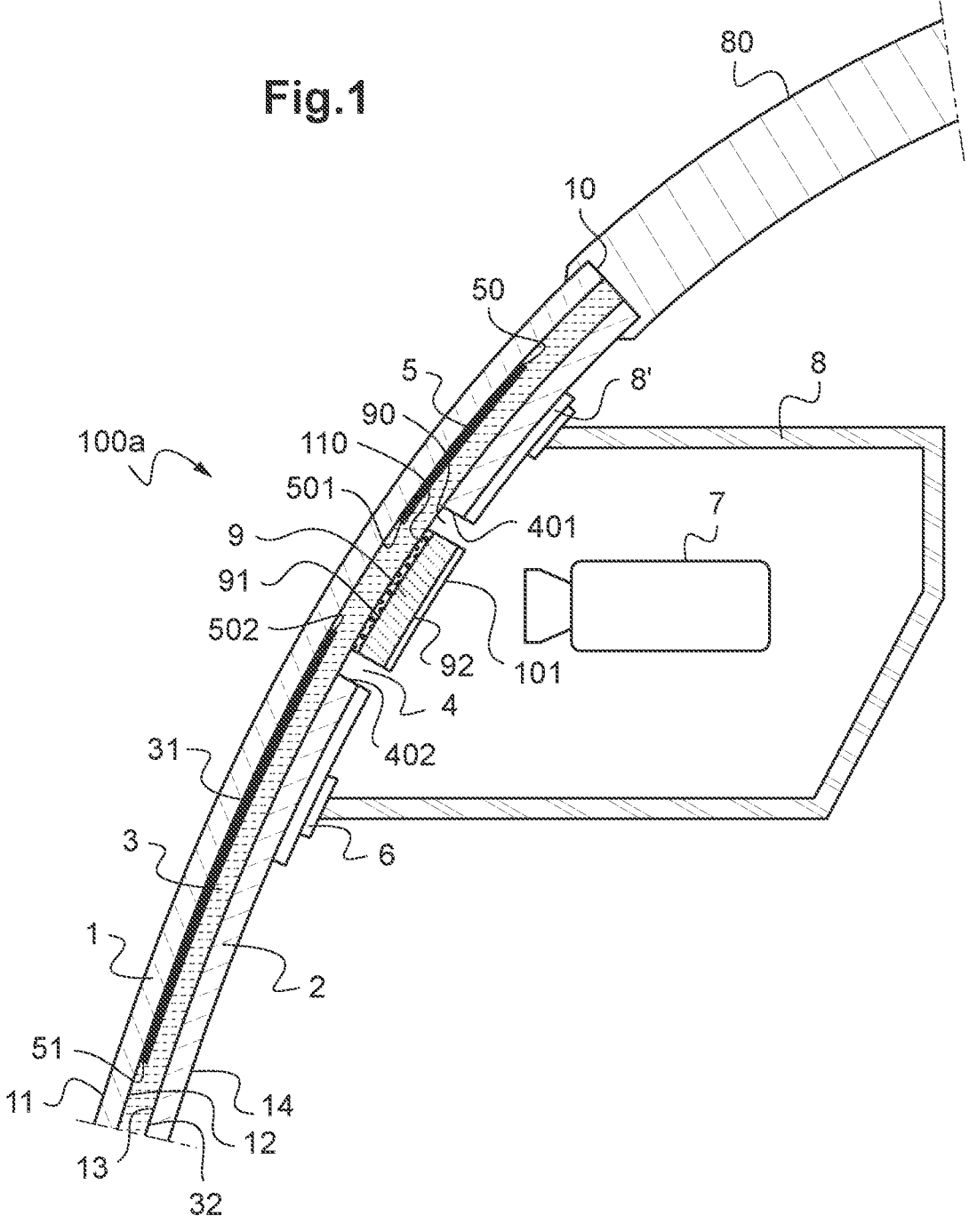
FIG. 1 shows a schematic sectional view of a windscreen
100a in a first embodiment of the invention with an infrared
detection, vision system such as a LIDAR.

Here, this infrared vision system 7 is placed behind the
windscreen facing a zone that is preferably located in the
central and upper part of the windscreen. In this zone, the
infrared vision system is oriented at a certain angle with
respect to the surface of the windscreen (face F4 14). In
particular, the transmitter/receiver 7 can be oriented directly
toward the image capture zone, in a direction that is nearly
parallel to the ground, that is to say slightly inclined toward
the road. In other words, the transmitter/receiver 7 of the
LIDAR can be oriented toward the road at a slight angle with
a field of vision suitable for fulfilling their functions.

As a variant, the receiver 7 is separate from the transmit-
ter, particularly adjacent.

The windscreen 100a is a curved laminated glazing
comprising:
an external glass sheet 1, with an exterior face F1 11 and
an interior face F2 12
and an internal glass sheet 2, for example with a thickness
or even of 1.6 mm or even less, with an exterior face F3
13 and an interior face F4 on the passenger compart-
ment 14 side
the two glass sheets being connected to one another by an
interlayer made of thermoplastic material 3 (single or
multi-laminations), most usually polyvinyl butyral
(PVB), preferably clear, of submillimetric thickness
optionally having a cross section decreasing in the
shape of a wedge from the top to the bottom of the
laminated glazing, for example a PVB (RC41 from
Solutia or Eastman) with a thickness of about 0.76 mm,
or as a variant if necessary an acoustic PVB (three-
layer or four-layer), for example with a thickness of
about 0.81 mm, for example an interlayer in three PVB laminations, PVB with a main internal face 31 toward face F2 12 and a main face 32 toward the passenger compartment.

The windscreen of a road vehicle in particular is curved.

In a conventional and well-known way, the windscreen is obtained by hot lamination of the first, second curved glass sheets 1, 2 and the interlayer 3. For example a clear PVB of 0.76 mm is selected.

The first glass sheet 1, particularly silica-based, soda-lime-based, soda-lime-silica-based (preferably), alumino-silicate-based, or borosilicate-based, has a total iron oxide content by weight (expressed in the form $Fe_2O_3$) of at most 0.05% (500 ppm), preferably of at most 0.03% (300 ppm) and at most 0.015% (150 ppm) and particularly greater than or equal to 0.005%. The first glass sheet can preferably have a redox greater than or equal to 0.15, and particularly between 0.2 and 0.30, particularly between 0.25 and 0.30. Particularly an extra clear glass, for example OPTWHITE glass of 1.95 mm is selected.

The second glass sheet 2 particularly silica-based, soda lime-based, preferably soda-lime-silica-based (like the first glass sheet), even aluminosilicate-based or borosilicate-based, has a total iron oxide content by weight of at least 0.4% and preferably of at most 1.5%.

The glasses of the applicant called TSAnx (0.5 to 0.6% iron) TSA2+, TSA3+(0.8 to 0.9% iron), TSA4+(1% iron), TSA5+, for example green, can be particularly mentioned. For example a TSA3+ glass of 1.6 mm is selected.

According to the invention, in a preferably central peripheral region, preferably along the upper longitudinal edge 10, the windscreen 100a comprises:

a through-hole 4, here closed, of the second glass sheet 2, which hole 4 is thus delimited by a wall of the glass 401 to 404 optionally in a variant with transmitter and separate receiver, close to the through-hole (which is for the receiver), another closed through-hole of the second glass sheet 2 (which is for the transmitter).

A central line M is defined passing through the middle of the upper edge which can be an axis of symmetry of the glazing.

The through-hole 4 can be central; then the line M passes through and divides it into two identical parts.

Figure 2A:
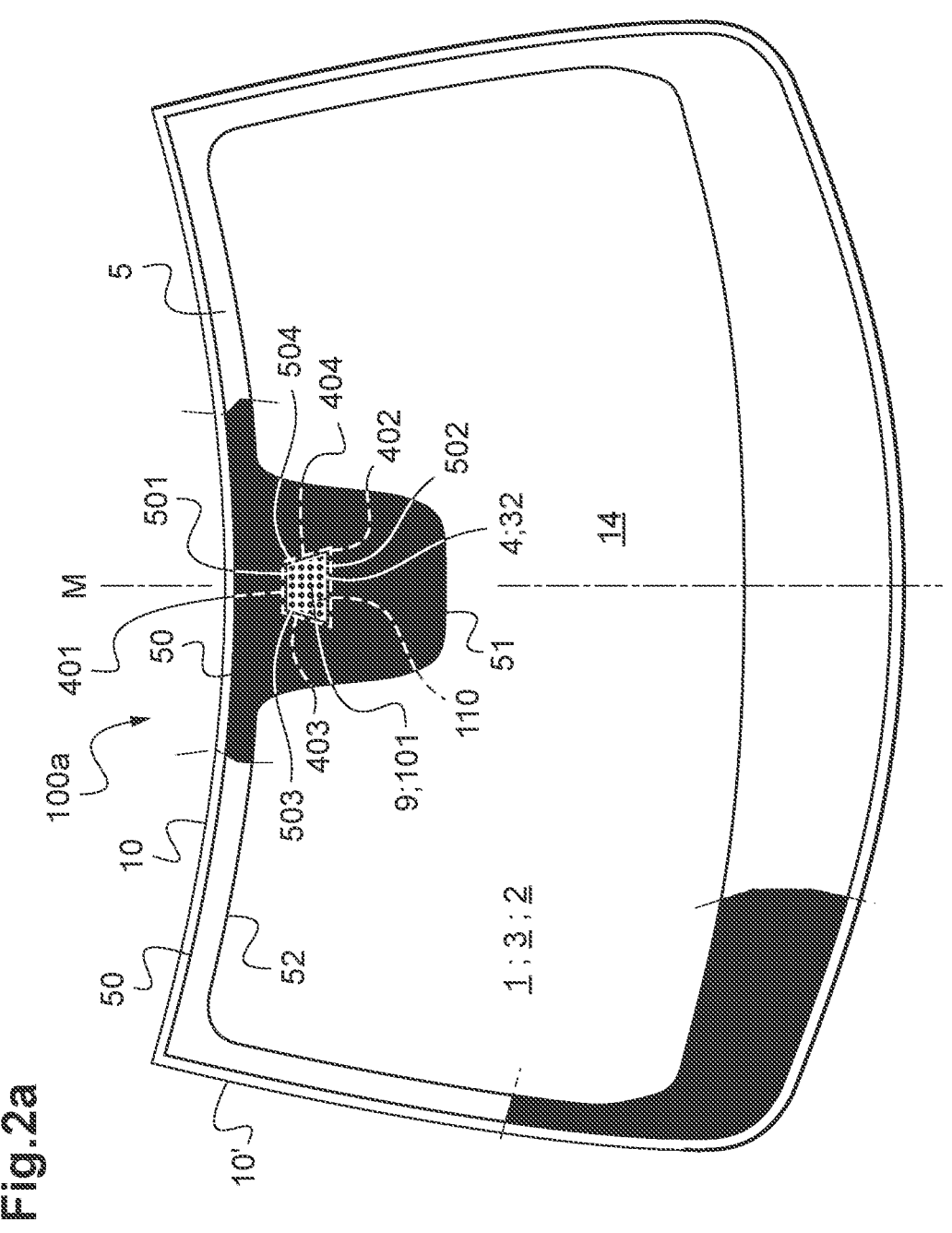
FIG. 2a shows a
schematic front view (passenger compartment side) of the
windscreen 100a of the first embodiment of the invention.

As shown in FIGS. 1 and 2a (sectional view along M), the through-hole is here a closed hole (surrounded by the wall of the glass sheet 2), thus within the glazing particularly—with trapezoidal cross section—comprising:

a first large side 401 or "upper" longitudinal edge closest to the edge face of the upper longitudinal edge of the glazing 10—parallel to this edge face—with a length of at most 20 cm for example 8 cm and spaced apart by at least 5 cm or 6 cm from the edge face 10 a second large side 402 or "lower" longitudinal edge (farthest from the edge face of the upper longitudinal edge 10, near the central zone) parallel to the first large side with a length of at most 25 cm or 20 cm and preferably greater than that of the first large side for example 14 cm, first and second small sides 403, 404, or oblique lateral edges.

The height (between the long sides 401, 402) is at least 3 or 5 cm, here 6 cm.

The other hole may be of the same size and the same shape. For example, they are two horizontal holes.

Figure 2B:
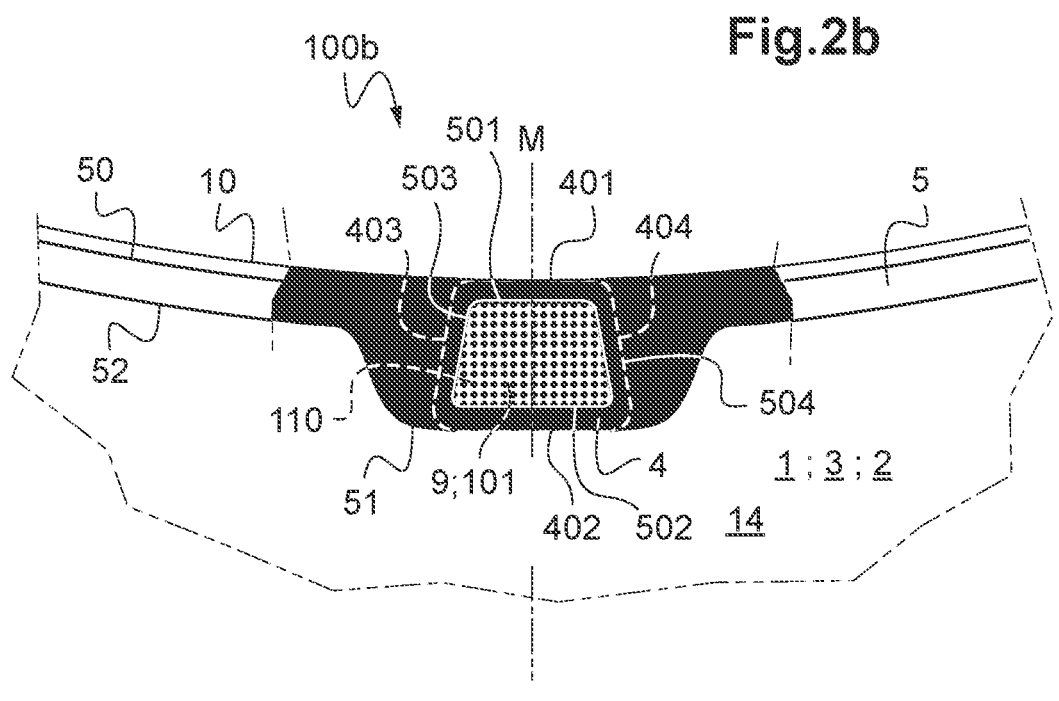
FIG. 2b shows a schematic front view (passenger com-
partment side) of the windscreen 100b in a first variant of the
first embodiment of the invention.
Figure 2C:
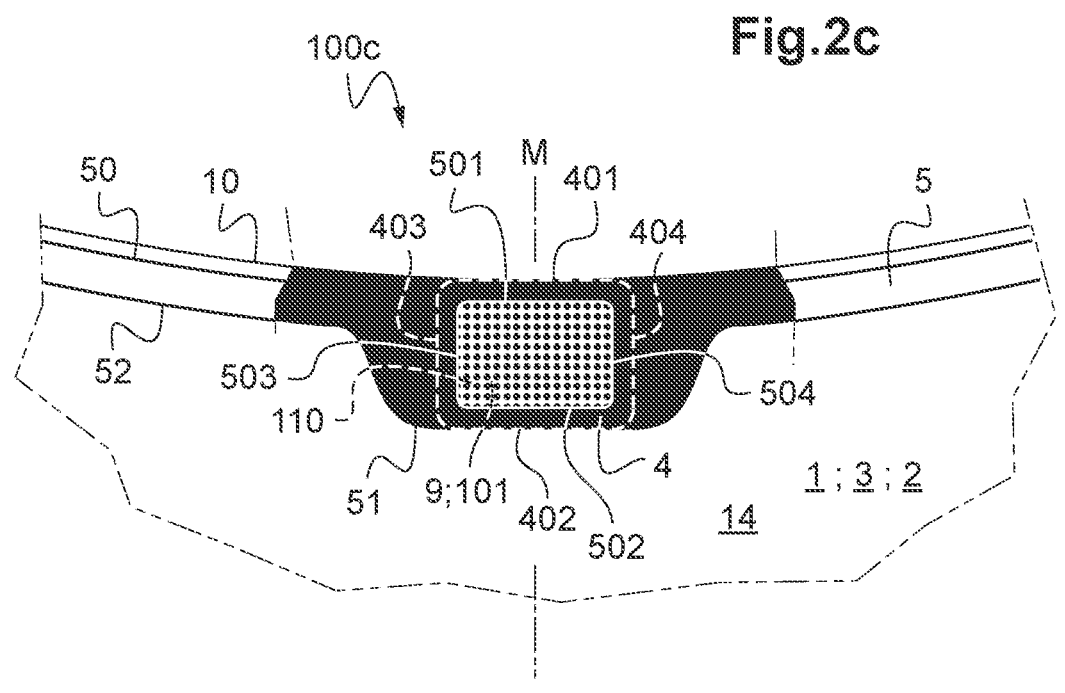
FIG. 2c shows a schematic front view (passenger com-
partment side) of the windscreen 100c in a second variant of
the first embodiment of the invention.

As shown in FIGS. 2b and 2c, the through-hole 4 can alternatively be a notch, for example of trapezoidal shape (FIG. 2b) or rectangular shape (FIG. 2c), thus a through-hole which preferably opens on the roof side (on the upper longitudinal edge 10).

The through-hole can have rounded corners (FIGS. 2b and 2c).

The closed or opening through-hole 4 can be in another region of the windscreen 100a or even in another glazing of the vehicle, in particular the rear window.

In the through-hole and optionally under the through-hole (under face F3) and/or flush over face F4, a piece 9 is present, made of material (particularly glass or glass ceramic or polymer) which is transparent at least at the "working" wavelength in the infrared of the LIDAR in a range extending from 800 nm to 1800 nm, in particular from 850 nm to 1600 nm, particularly 905±30 nm and/or 1550±30 nm.

The piece 9 has a thickness of at least 0.1 mm or 0.3 mm and better still of at least 0.7 mm and preferably of at most 3 mm or 2 mm, particularly a piece with a size (width and/or surface area) smaller than the through-hole.

The piece 9 has an edge face in contact with or spaced apart from the wall 401, 402 delimiting the through-hole by at most 5 mm, preferably spaced apart and by a distance of at most 2 mm and even ranging from 0.1 mm or 0.3 mm to 2 mm.

The piece is for example an extra clear glass from 0.1 to 2 mm, soda-lime-silica, curved and thermally tempered.

The first glass sheet 1 and the piece 9 can be an OPTIWHITE® of 1.95 mm.

The piece is alternatively a flexible extraclear curved glass of 0.5 mm or 0.7 mm and optionally chemically tempered.

For example, it is Gorilla® glass.

The piece 9 has a main "connecting" surface 91 oriented toward face F2, connected to main face Fb.

The piece 9 has a main "interior surface" surface 92, opposite the connecting surface 91. The interior surface comprising an element which is anti-reflective at said working wavelength, for example an anti-reflective porous silica coating 101.

The piece 9 comprises, preferably on the connecting surface 91, a camouflaging coating forming a selective filter 110 which absorbs in the visible range and is transparent at the working wavelength. It serves to substantially mask the through-hole 4.

The laminated glazing having, in the zone of the through-hole with the camouflaging coating, a total transmission of at least 80.0% at the working wavelength and preferably a total transmission of at most 1.0% or 0.5% in the visible range at the reference value in a range from 400 nm to 700 nm.

The camouflaging coating 110 comprises an organic matrix and an organic pigment, dispersed in said matrix, which absorbs the light located in said visible range and which is transparent at said working wavelength, camouflaging coating of a thickness of at most 30 μm. The organic pigment represents between 0.1 and 10% by weight of the camouflaging coating, preferably between 0.2 and 3% by weight of the camouflaging coating.

Table 1 indicates the L* a* b* and thickness values and the values for transmission in the visible range and infrared in three examples of organic ink deposited by screen-printing on a 1.85 mm Optiwhite extra clear glass, ink dried between 120° C. and 150° C. for less than 10 minutes.

TABLE 1

| Examples | Thickness (μm) | L* | a* | b* | Transmission <700 nm [%] | Transmission 905 nm [%] | Transmission 1550 nm [%] |
|---|---|---|---|---|---|---|---|
| Example 1 | 10 ± 0.5 | 2.0 | 1.2 | 0.5 | <0.1 | 70% | 83% |
| Example 2 | 10 ± 0.5 | 2.5 | 1.0 | 0.2 | <0.1 | 83% | 89% |
| Example 3 | 7 ± 0.5 | 2.5 | 1.0 | 0.2 | <0.1 | 85% | 92% |

The transmission is increased when the thickness is reduced, for example 3 compared to example 2.

The windscreen 100a further comprises on face F2 12 an opaque masking layer for example black 5, such as a layer of enamel or a lacquer, forming a peripheral frame of the windscreen (or of the window) particularly along the upper longitudinal edge 10 of the glazing and particularly along the left lateral edge 10' of the glazing.

The external edge 50 of the masking layer 5 closest to the edge face 10 of the glazing can be spaced apart by 1 or 2 mm to several cm from the edge face 10 (longitudinal edge).

The opaque masking layer 5 here has a greater width in the central zone than in the other peripheral zones, on either side of the central zone. The masking layer 5 has an internal (longitudinal) edge 51 in the central zone of the windscreen and an internal (longitudinal) edge 52 on either side of the central zone.

This central zone being provided with the closed hole 4 (FIG. 2a), this masking layer 5 comprises:

in line with the first hole 4, a first gap that is large enough not to disrupt the performance of the transmitter/receiver (or of the separate receiver) 7, particularly slightly smaller than the through-hole 4 where appropriate, in the variant, in line with the other hole, a second gap that is large enough not to disrupt the performance 7 separate transmitter, particularly slightly smaller than the other through-hole.

The first gap here has the same trapezoidal shape as the hole 4 with two large sides 501, 502 and two small sides 503, 504. The first gap can be preferably smaller than the hole 4 for example the walls 501 to 504 delimiting the first gap protruding by at most 50 mm or 10 mm or even 5 mm from the walls of the glass 401 to 404 and even are aligned with the edge face of the piece 9 in order to perfect the camouflaging as seen from the outside.

As a variant, this is a rectangle or any other shape particularly inscribed in the surface of the through-hole (trapezoidal or another).

The opaque masking layer 5 is capable of masking the casing 8 (plastic, metal, etc.) of the LIDAR 7. The casing 8 can be adhered to face F4 14 by an adhesive 6 and to the roof 80. The casing may be attached to a plate 8' mounted on face F4, with holes to allow said IR rays to pass.

The windscreen 100a can comprise a set of metal wires that are almost invisible, for example of 50 μm, which are placed in or on a face of the lamination interlayer 3 (over the entire surface), for example face Fb 32 on the side of F3, in the form of lines that are optionally straight. Here, these almost-invisible metal wires are absent in line with the through-hole 4.

As a variant, the through-hole serves for an SWIR camera in the passenger compartment and has for example a minimum size of 5 cm long and 2 cm high to a maximum size of 25 cm long and 6 cm high.

Figure 3:
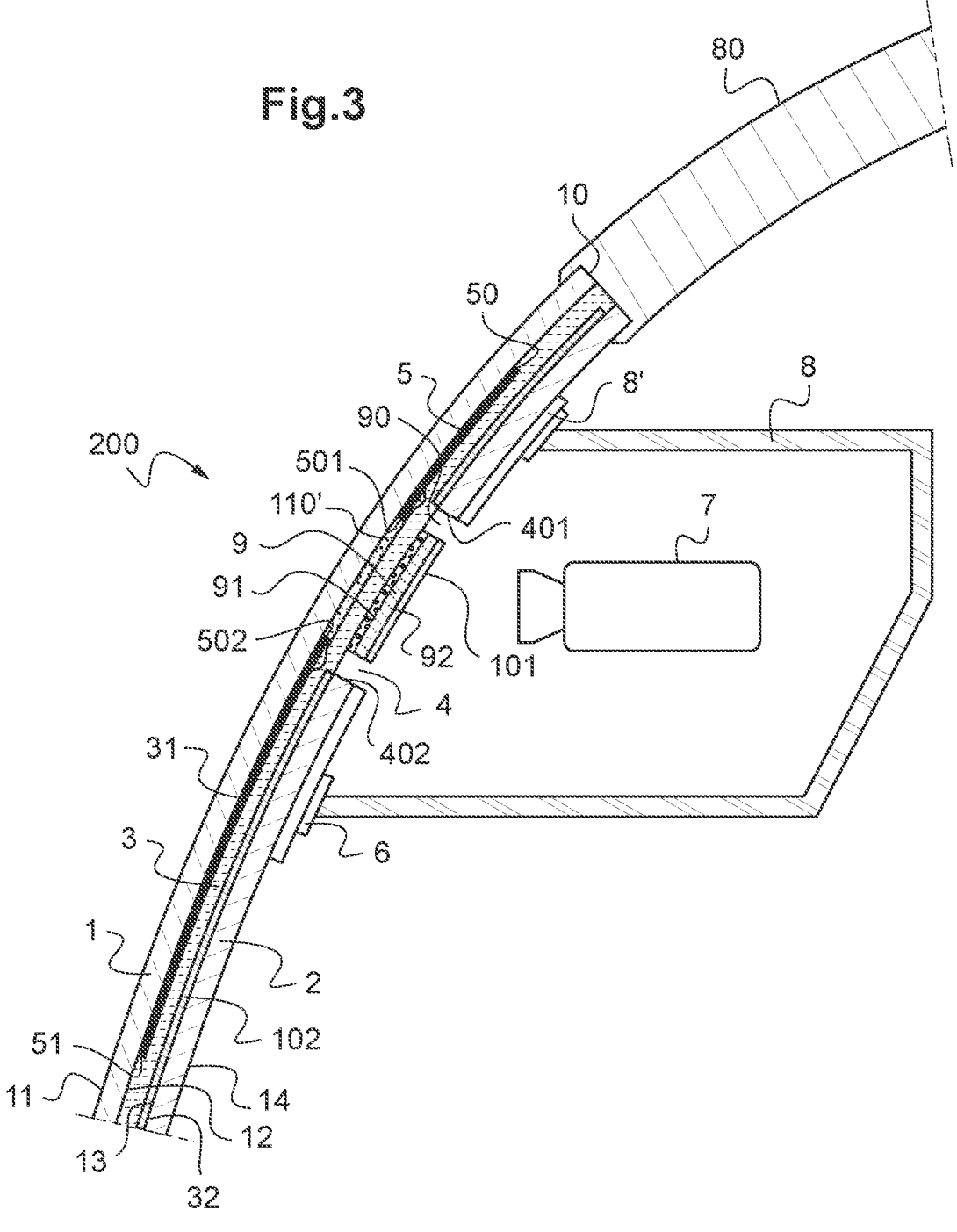
FIG. 3 shows schematically in cross sectional view a
windscreen 200 according to the invention with an infrared
vision system such as a LIDAR in a second embodiment of
the invention.

FIG. 3 shows schematically in cross sectional view a windscreen 200 according to the invention with an infrared vision system such as a LIDAR in a second embodiment of the invention.

Only the differences with the first embodiment are explained hereunder.

The piece 9 is a flexible curved glass of 0.7 mm which is extra clear and optionally tempered.

The first glass sheet 1 comprises, on face F2 12, another camouflaging coating 110' which is transparent at the working wavelength in the infrared and absorbs in the visible range, covering the gap of the masking layer 5 and even protruding over the masking layer. It is chosen to be similar to the camouflaging coating 110.

The other camouflaging coating 110' is for example identically shaped to the gap. It is possible to enlarge the gap (for example the edges 501 and 502 are under face F3) and the other coating extends further to mask the zone between the walls 401, 402 of the through-hole and the edge face of the piece 9.

The edges of the camouflaging coating 110' then optionally protrude between face F2 12 and face Fa 31 for example at most by 10 mm or 5 mm from the walls 401 to 404 delimiting the through-hole 4.

The camouflaging coating 110' alternatively has a different shape to that of the section of the through-hole, thus for example a rectangular shape.

The glazing comprises, on face F3 13, a functional layer 102 extending on the glazing, which is electrically conductive, transparent (in the visible range), preferably heating, in particular a silver stack. The transparent electrically conductive functional layer can comprise a stack of thin layers comprising at least one metal functional layer such as silver arranged between dielectric layers.

Figure 4:
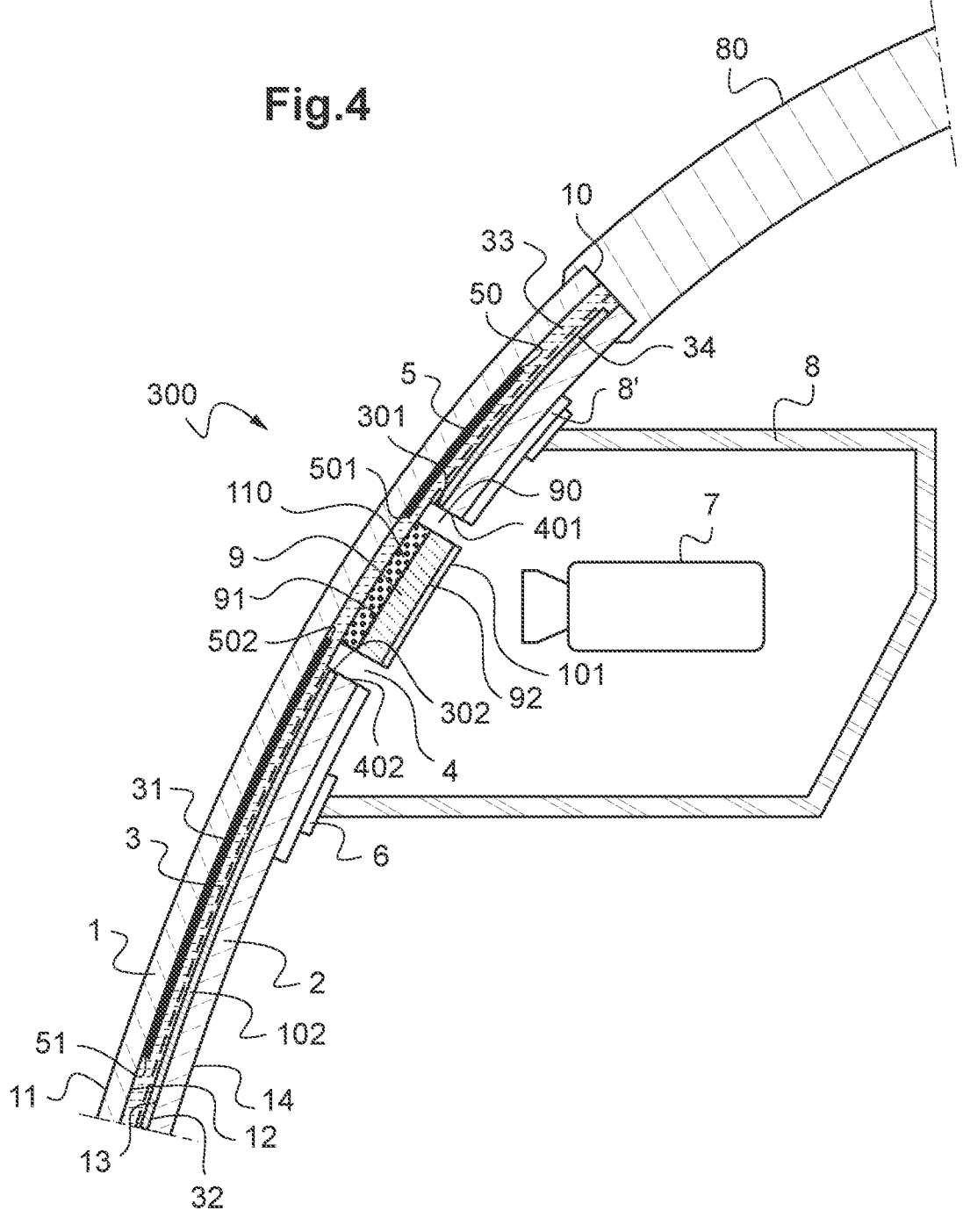
FIG. 4 shows a schematic sectional view of a windscreen
300 according to the invention with an infrared vision
system such as a LIDAR in a third embodiment of the
invention.

FIG. 4 shows a schematic sectional view of a windscreen 300 according to the invention with an infrared vision system such as a LIDAR in a third embodiment of the invention.

Only the differences with the first embodiment are explained hereunder.

The windscreen 300 comprises, on face F3 13, a functional layer 102 extending on the glazing, which is electrically conductive, transparent (in the visible range), preferably heating, in particular a silver stack. The transparent electrically conductive functional layer can comprise a stack of thin layers comprising at least one metal functional layer such as silver arranged between dielectric layers.

The lamination interlayer 3, for example made of two PVB sheets 33, 34, has a partial interlayer hole in line with the through-hole 4 (for example full hole on the sheet 34, on face F3 side).

The interlayer hole may preferably be identical in size to, or wider than, the hole 4 and even optionally is a closed partial interlayer hole in the thickness of the lamination interlayer 3 delimited by an interlayer wall 301.

The interlayer hole here has the same trapezoidal shape as the hole 4 with two long sides and two short sides. The interlayer hole can preferably be identical in size to, or wider than, the hole 4 for example the walls 301 delimiting the partial interlayer hole being set back by at most 10 mm or 5 mm from the walls of the glass 401 to 404. As a variant, this is a rectangle or any other shape encompassing the surface of the through-hole (trapezoidal or other).

As a variant of the first, second and third embodiments, the opaque masking layer 5 is not widened in the central zone (passing by M).

It is then possible to supplement the masking (from the outside) in this central zone by adding another camouflaging coating, for example that described previously, on piece 9 on face F2 in the zone of the through-hole and under face F3.

The other camouflaging coating can also be on a functional element arranged within the lamination interlayer, for example in two PVB sheets.

The windscreen for example can then comprise an athermal and/or heating electrically conductive layer on face F2 12, extending over the glazing (outside the enamel zone 5). The athermal electrically conductive layer lacks or is provided with a first trapezoidal gap (as a variant, rectangular, or any other shape) in line with the through-hole 4.

The functional masking element comprises a sheet or support particularly made of polymer for example PET of 100 μm or UTG, which is transparent at the working wavelength of the LIDAR with a first main face on the side of face F2 and with a second main face on the side of face F3. The first face (alternatively the second main face 62) carries said other camouflaging coating that is opaque in the visible range and transparent at the working wavelength.

As a variant, the first face 61 (alternatively the second main face 62) bears a coating that is opaque in the visible range the infrared, provided with a trapezoidal gap (as a variant, rectangular, or any other shape) in line with the through-hole 4.

Figure 5:
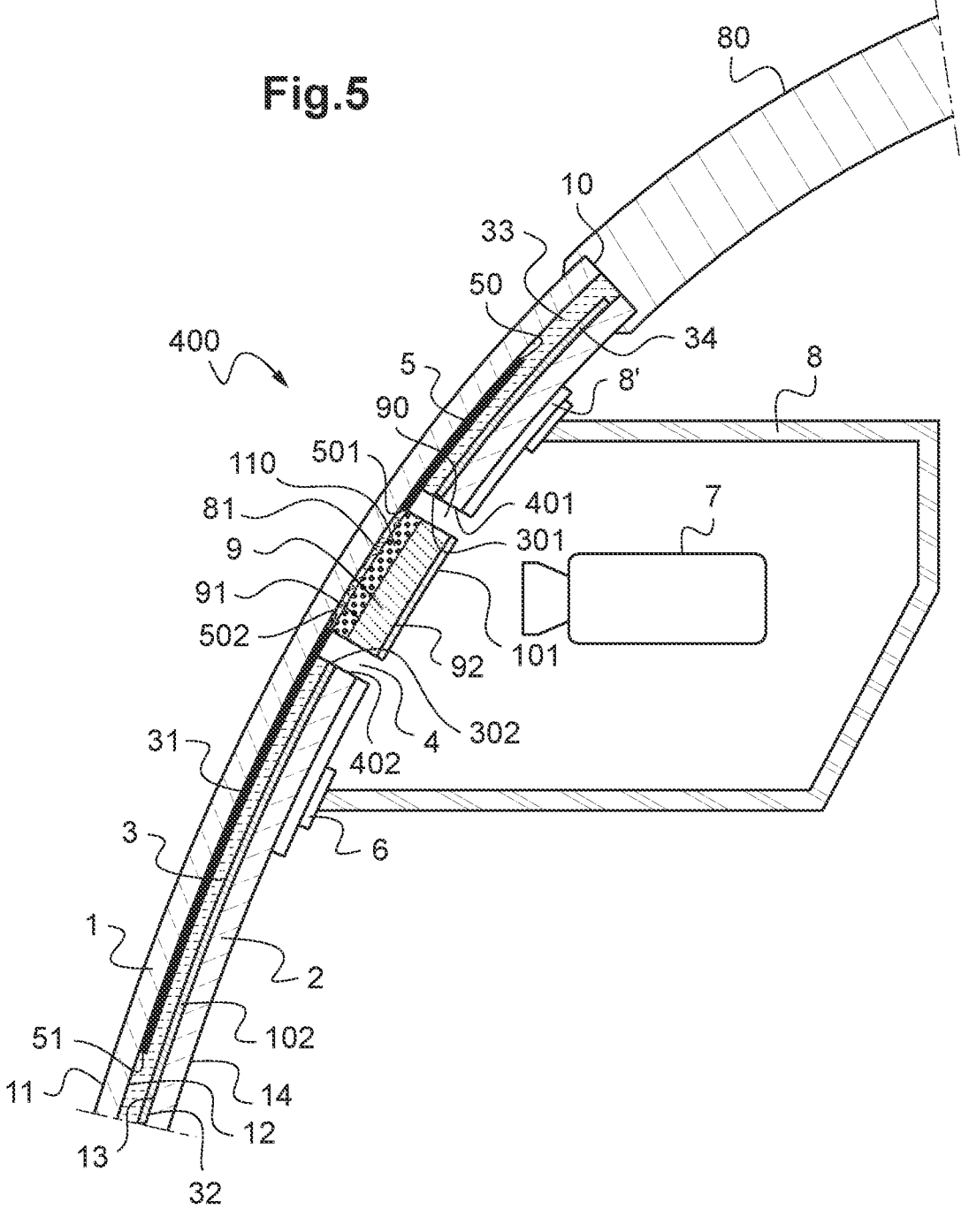
FIG. 5 shows a schematic sectional view of a windscreen
400 according to the invention with an infrared vision
system such as a LIDAR in a fourth embodiment of the
invention.

FIG. 5 shows a schematic sectional view of a windscreen 400 according to the invention with an infrared vision system such as a LIDAR in a fourth embodiment of the invention. Only the differences with the third embodiment are explained below.

This time, the interlayer hole 3, 301, 302 is a through-hole, for example with a width equal to or greater than the width of the through-hole 4. Thus, a connecting element, which is adhesive (thermosetting for example) 81 or a thermoplastic connecting film (PVB or not) is added to connect the piece 9 to face F2 12. The connecting element 81 is transparent at the working wavelength. It may be of submillimetric thickness.

The adhesive or the film 81 can slightly cover the edges 501, 502 of the opaque layer 5 or does not make contact with the opaque layer 5.

Figure 6:
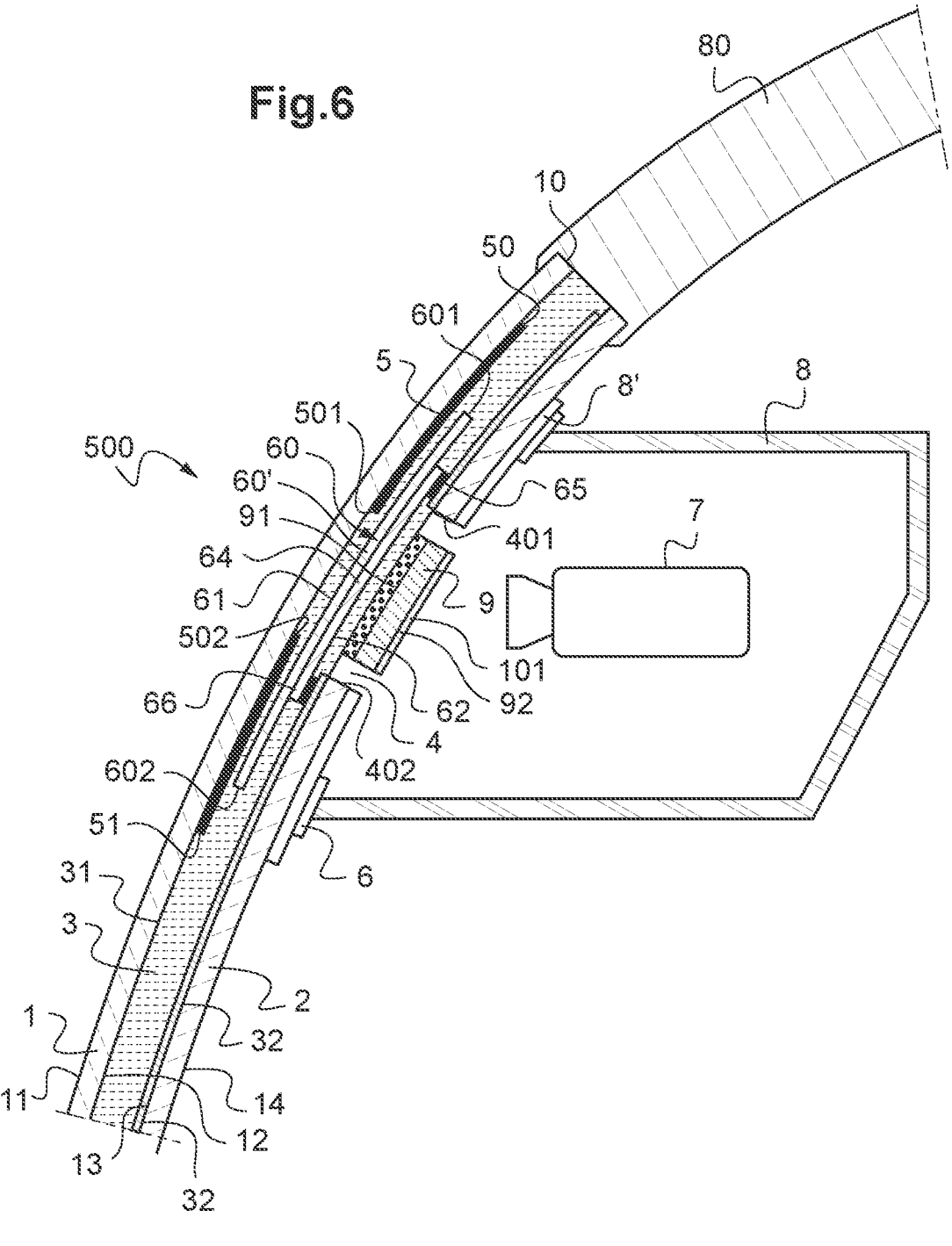
FIG. 6 shows a schematic sectional view a of windscreen
500 according to the invention, with an infrared vision
system such as a LIDAR in a fifth embodiment of the
invention.
Figure 7:
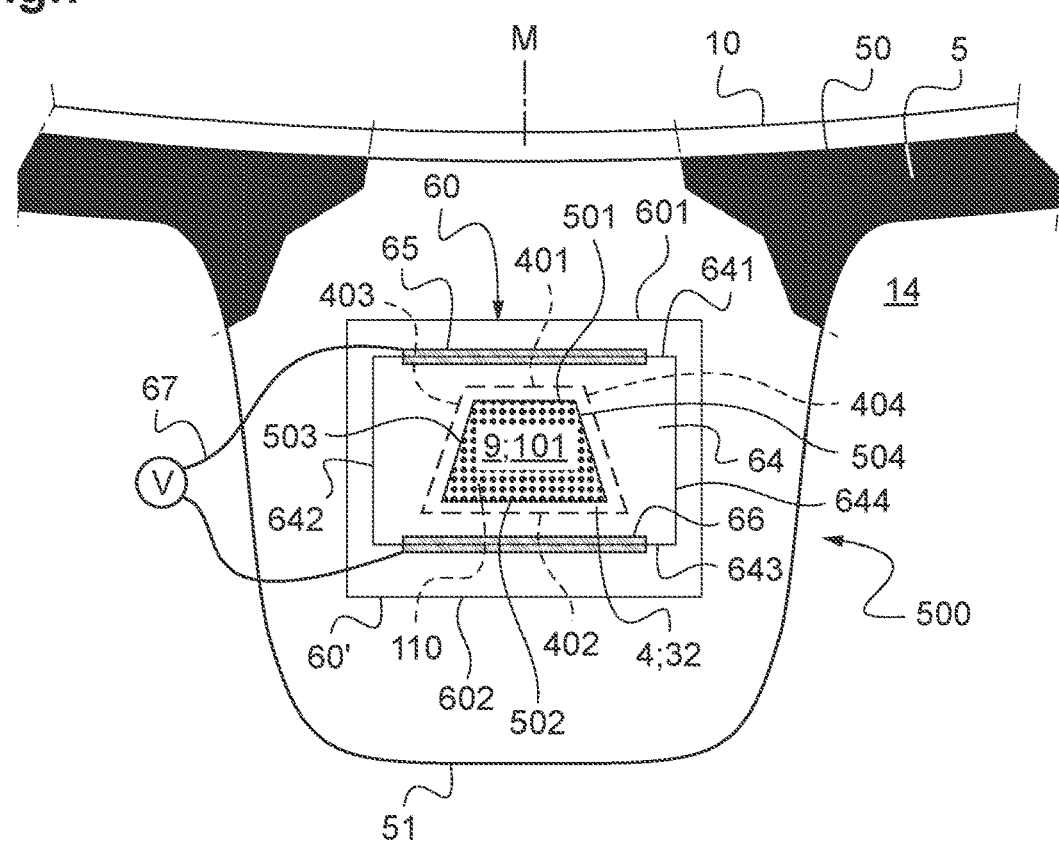
FIG. 7 shows a schematic front view of the windscreen
500.

FIG. 6 shows a schematic sectional view a of windscreen 500 according to the invention, with an infrared vision system such as a LIDAR in a fifth embodiment of the invention. FIG. 7 shows a schematic front view of the windscreen 500. Only differences in relation to the first embodiment are explained hereinafter.

A functional heating element 60 is arranged within the lamination interlayer 3, for example between two PVB sheets. It has an upper edge 601 under the enamel zone 5 and a lower edge 602 toward the center of the windscreen. It extends so as to cover the region of the through-hole 4 and protrudes underface F3 while remaining masked by the opaque layer 5 outside of the zone of the through-hole 4.

The functional heating element 60 comprises a polymer sheet or support 60', for example PET of 100 μm (or alternatively extra clear glass, particularly UTG), which is transparent at the working wavelength of the LIDAR with a first main face 61 on the side of face F2 and with a second main face 62 on the side of face F3. The support 60' is for example rectangular in shape with horizontal longitudinal edges 601 and 602.

The second face 62 (alternatively the first main face 61) carries a heating layer 64, for example rectangular in shape (for example the same shape as the film 60') facing the through hole 4 forming a local heating zone.

The heating coating 64 is made of material which is transparent at least at the "working" wavelength in the infrared, particularly made of transparent conductive oxide.

The horizontal longitudinal edges or long sides 641, 643 of the heating layer 64 can be parallel to the long sides of the through-hole 4. The short sides 642, 644 can be parallel to the short sides of the through-hole.

The rectangular heating zone 64 is provided with two electrical leads or first and second horizontal (dedicated) local busbars 65, 66, preferably offset from the through-hole (under face F3) on either side of the long sides of the through-hole 4 supplied with power 67 for example at 15 V or 48 V, or even 12 V or 24 V.

The length of the busbars are adapted in a tailored manner, preferably equal to or longer than the long sides of the through-hole 4. In the case of a round or oval through-hole, the substantially horizontal busbars can be curved to follow the shape of the through-hole.

It is sought to place the busbars as close together as possible in order to increase the power density.

The functional heating element 60 can carry a sensor (antenna and) electroluminescent screen particularly on face 62 side F3 and outside the zone of the through-hole.

The functional heating element 60 can also serve as additional camouflaging by adding another camouflaging coating, for example as described previously on piece 9. The design and extend thereof are adapted based on the requirements, for example in the zone of the through-hole which is not camouflaged by the coating 91 (between the piece and the wall 401 and 402 of the hole) and/or facing the piece in order to reinforce the camouflaging, if necessary.

The other camouflaging coating can preferably be on face 61, here opposite the heating layer or alternatively even on all or part of the heating layer and the busbars (preferably on face 61).

Figure 8:
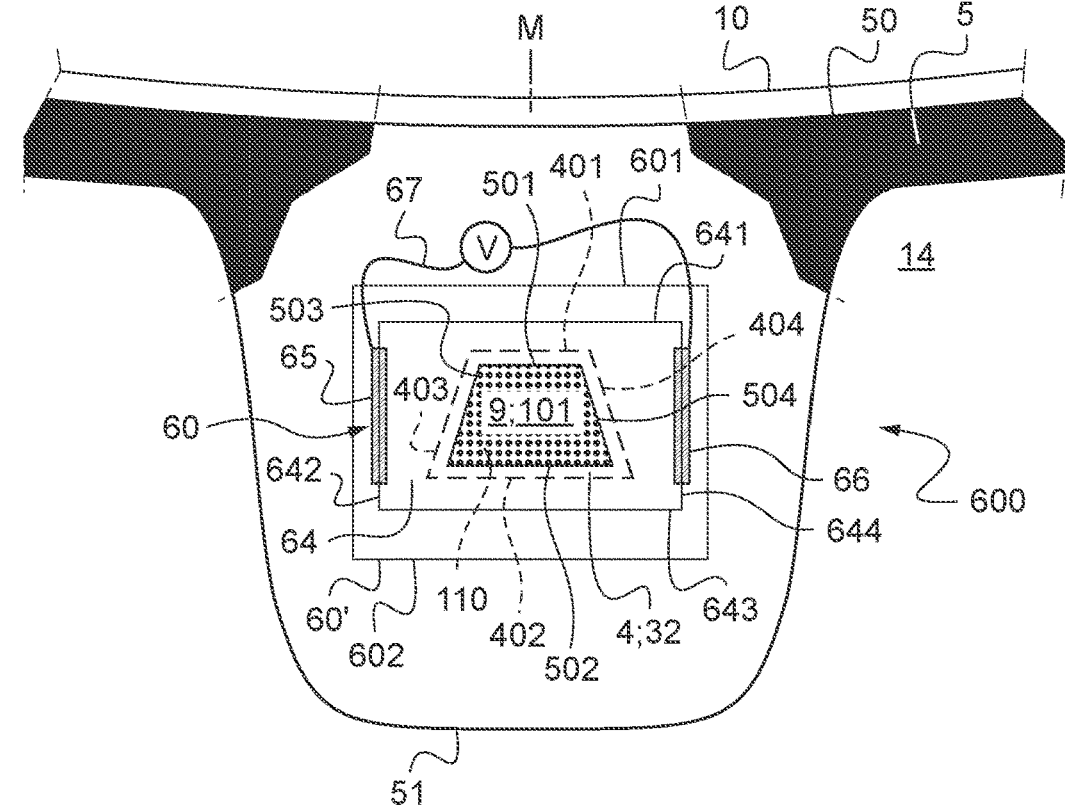
FIG. 8 shows a schematic front view of a windscreen 600
according to the invention, with an infrared vision system
such as a LIDAR in a sixth embodiment of the invention.

As a variant (FIG. 8), the first and second busbars are lateral 65, 66, here vertical or, as a variant, oblique, parallel to the short sides 403, 404 of the through-hole 4.

Vertical or oblique lateral busbars (parallel with respect to the small sides of the through-hole 4) may be preferred since horizontal busbars can generate local overthicknesses that promote distortions.

As an alternative for local heating in the configurations with PVB in the zone of the through-hole, face Fb 32 comprises a first metal heating wire, anchored to the lamination interlayer, facing the through-hole 4, which first wire is coiled.

The wire can also be on the side of face Fa or inside the lamination interlayer.

Figure 9:
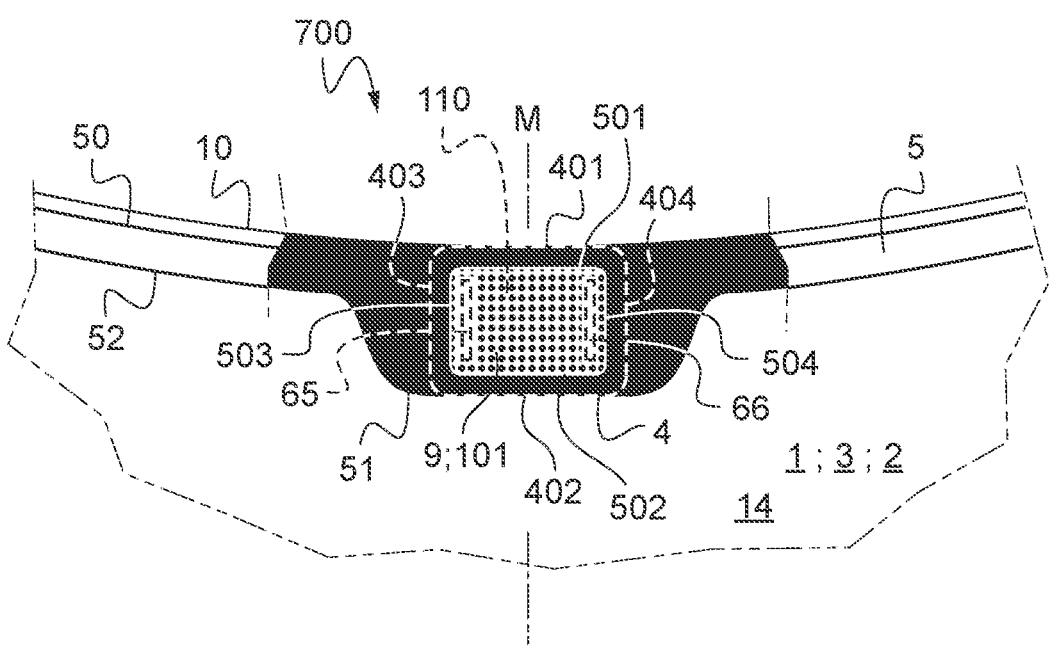
FIG. 9 shows a schematic front view of a windscreen 700
according to the invention, with an infrared vision system
such as a LIDAR in a seventh embodiment of the invention.

FIG. 9 shows a schematic front view of a windscreen 700 according to the invention, with an infrared vision system such as a LIDAR in a seventh embodiment of the invention. Only the differences in relation to the sixth embodiment are explained below.

For example, the through-hole 4 is a notch opening onto the edge face 10 of the upper longitudinal edge, rectangular in shape like the piece 9.

The support 60 is eliminated.

The heating layer 64 with the oblique busbars 65, 66 is placed on the connecting surface 91 of the piece 9, under (or over) the camouflaging coating 110. The busbars 65, 66 are parallel to the short sides of the piece (and of the layer 64) or, as a variant, to the long sides of the piece.

The invention claimed is:

1. A vehicle laminated glazing, comprising:
a first glass sheet forming an exterior glazing, with a first external main face and a second internal main face to be oriented toward a passenger compartment of a vehicle,
a lamination interlayer made of polymer material with a first main face oriented toward the second internal main face and a second main face opposite the first main face,
a second glass sheet forming an interior glazing with a third main face on the side of the second internal main face and a fourth internal main face oriented toward the passenger compartment,
wherein the first glass sheet has a total iron oxide content by weight of at most 0.05%,
a through-hole in a thickness of the second glass sheet, the through-hole being centimetric, hole delimited by a wall, closed-off hole or opening hole,
in the through-hole, a piece which is transparent at least at a working wavelength in an infrared in a range extending from 800 nm to 1800 nm,
the piece having a main connecting surface oriented toward and connected to the second internal main face,
the piece having a main interior surface, opposite the main connecting surface,
wherein the piece comprises a camouflaging coating forming a selective filter which absorbs in the visible range and is transparent at the working wavelength,
and wherein the vehicle laminated glazing has, in a zone of the through-hole with the camouflaging coating a total transmission of at most 10.0% in the visible range.

2. The vehicle laminated glazing according to claim 1, wherein the laminated glazing has, in the zone of the through-hole with the camouflaging coating, a total transmission of at least 80.0% at the working wavelength.

3. The vehicle laminated glazing according to claim 1, wherein the camouflaging coating comprises an organic matrix and a coloring agent dispersed in said organic matrix, and wherein the coloring agent absorbs the light located in said visible range and is transparent at said working wavelength, the camouflaging coating having a submillimetric thickness.

4. The vehicle laminated glazing according to claim 3, wherein the coloring agent represents between 0.1 and 10% by weight of the camouflaging coating.

5. The vehicle laminated glazing according to claim 1, comprising a masking zone which is opaque in the visible range, the making zone being present at an edge of the piece or of the through-hole.

6. The vehicle laminated glazing according to claim 5, wherein the masking zone which is opaque in the visible range comprises:
a) a masking layer which is opaque in the visible range and at the working wavelength, which is in the form of at least one film which is opaque in its bulk or a coating which is: on the first or the second glass sheet, or on the lamination interlayer, or on a submillimetric substrate between the second internal main face and the third main face,
b) and/or another camouflaging coating, forming a selective filter which absorbs in the visible range and is transparent at the working wavelength.

7. The vehicle laminated glazing according to claim 6, wherein the camouflaging coating is defined by an L*1 of at most 5, a*1, b*1, and the opaque masking layer according to a) is defined by an L*2 of at most 5.

8. The vehicle laminated glazing according to claim 1, wherein the main interior surface comprises an element which is anti-reflective at said working wavelength.

9. The vehicle laminated glazing according to claim 1, wherein the piece has a thickness of 2.2 mm less.

10. The vehicle laminated glazing according to claim 1, comprising a local heating zone under and/or in said through-hole, spaced apart or on the main connecting surface.

11. The vehicle laminated glazing according to claim 1, comprising a functional element connected to the lamination interlayer, wherein the functional element comprises a sheet, the functional element having a first zone facing the through-hole, in the first zone said functional element being transparent at said working wavelength.

12. The vehicle glazing according to claim 11, wherein the sheet comprises on the first main face oriented toward the second internal main face or the third main face:
an electrically conductive coating forming a heating layer facing the through-hole, which is transparent at said working wavelength,
and/or the sheet comprises, on the first main face or the second, opposite main face:
an opaque masking element at least partially offset from the through-hole or protruding by at most 20 mm or 10 mm into the through-hole,
or another camouflaging coating forming a selective filter which absorbs in the visible range and is transparent at the working wavelength on an edge zone of the piece or the through-hole and/or under the through-hole.

13. The vehicle laminated glazing according to claim 1, wherein the first glass sheet comprises, on the second internal main face, a functional coating with a first zone facing the through-hole, which functional coating is transparent at said working wavelength in the first zone.

14. The vehicle laminated glazing according to claim 1, wherein the lamination interlayer comprises a PVB, optionally having a partial interlayer hole in line with the through-hole, or wherein the lamination interlayer comprises a PVB, having an interlayer through-hole, in line with the through-hole.

15. The vehicle laminated glazing according to claim 1, wherein the vehicle laminated glazing is a laminated glazing of a road or railway vehicle.

16. The vehicle laminated glazing according to claim 1, wherein the vehicle laminated glazing is a windscreen or a rear window.

17. The vehicle laminated glazing according to claim 4, wherein the organic matrix comprises monomers, oligomers, or polymers comprising at least one methacrylate function, epoxides, varnishes consisting of dispersed PVB particles, latex, polyurethane or acrylate.

18. The vehicle laminated glazing according to claim 8, wherein the anti-reflective element comprises an anti-reflective coating on the interior surface.

19. A device, comprising:
said vehicle laminated glazing according to claim 1, and
an infrared detection system at the working wavelength in the infrared, arranged in the passenger compartment and comprising a transmitter and/or receiver, so as to transmit and/or receive radiation passing through the laminated glazing at the through-hole with the piece.

20. The device according to claim 19, wherein the infrared detection system is a LIDAR or a near infrared camera.

\* \* \* \* \*